(12) United States Patent
Steiner et al.

(10) Patent No.: US 9,369,688 B2
(45) Date of Patent: Jun. 14, 2016

(54) 3D USER PERSONALIZED MEDIA TEMPLATES

(75) Inventors: Julie Steiner, Toronto (CA); Mayur Patel, Toronto (CA); Daniel T. Cochran, Toronto (CA); Tony Meerakker, Toronto (CA)

(73) Assignee: PERCY 3DMEDIA, INC., Toronto (CA)

( * ) Notice: Subject to any disclaimer, the term of this patent is extended or adjusted under 35 U.S.C. 154(b) by 829 days.

(21) Appl. No.: 13/544,451

(22) Filed: Jul. 9, 2012

(65) Prior Publication Data

US 2013/0147913 A1 Jun. 13, 2013

Related U.S. Application Data

(60) Provisional application No. 61/505,757, filed on Jul. 8, 2011.

(51) Int. Cl.
*H04N 13/00* (2006.01)
*H04N 21/2543* (2011.01)
*H04N 21/2743* (2011.01)
*H04N 21/414* (2011.01)
*H04N 21/472* (2011.01)
*H04N 21/4782* (2011.01)
*H04N 21/4788* (2011.01)
(Continued)

(52) U.S. Cl.
CPC .......... *H04N 13/0007* (2013.01); *G11B 27/034* (2013.01); *H04N 21/2543* (2013.01); *H04N 21/2743* (2013.01); *H04N 21/41407* (2013.01); *H04N 21/4782* (2013.01); *H04N 21/4788* (2013.01); *H04N 21/47202* (2013.01); *H04N 21/816* (2013.01); *H04N 21/8173* (2013.01); *H04N 21/84* (2013.01); *G11B 27/34* (2013.01); *H04N 21/25816* (2013.01); *H04N 21/4786* (2013.01); *H04N 21/4856* (2013.01); *H04N 21/4858* (2013.01); *H04N 21/4882* (2013.01); *H04N 21/8549* (2013.01)

(58) Field of Classification Search
None
See application file for complete search history.

(56) References Cited

U.S. PATENT DOCUMENTS 6,351,265 B1 2/2002 Bullman
7,216,092 B1 5/2007 Weber et al.
(Continued)

FOREIGN PATENT DOCUMENTS

EP 1370075 12/2003
WO 9527372 10/1995

OTHER PUBLICATIONS

International Search Report issued for PCT/US12/45946, dated Oct. 12, 2012 (2 pages).

*Primary Examiner* — Sath V Perungavoor
*Assistant Examiner* — Janese Duley
(74) *Attorney, Agent, or Firm* — Ted Sabety; Sabety + associates, PLLC

(57) ABSTRACT

In one aspect, the present disclosure relates to a method for providing a user with three dimensional user personalized video. In some embodiments, the method includes providing, from a web server, a user with a selection of video clips stored in a database; receiving at the web server a selection of a video clip; receiving at the web server data from the user, wherein said data can be a plurality of symbols to personalize the video clip; rendering, using a rendering module, a three dimensional personalized video clip using the selected movie clip and the plurality of symbols; and providing, from the web server, the three dimensional personalized video clip to the user.

15 Claims, 34 Drawing Sheets

(51) Int. Cl.
- *H04N 21/81* (2011.01)
- *H04N 21/84* (2011.01)
- *G11B 27/034* (2006.01)
- *H04N 21/258* (2011.01)
- *H04N 21/4786* (2011.01)
- *H04N 21/485* (2011.01)
- *H04N 21/488* (2011.01)
- *H04N 21/8549* (2011.01)
- *G11B 27/34* (2006.01)

(56) References Cited

U.S. PATENT DOCUMENTS

| | | | |
|---|---|---|---|
| 8,006,261 B1 * | 8/2011 | Haberman | G11B 27/031 725/32 |
| 8,296,456 B2 * | 10/2012 | Klappert | H04N 9/75 348/143 |
| 2002/0094189 A1 | 7/2002 | Navab et al. | |
| 2004/0107169 A1 | 6/2004 | Lowe | |
| 2006/0007243 A1 | 1/2006 | Miller | |
| 2008/0141175 A1 | 6/2008 | Sarna et al. | |
| 2009/0135176 A1 | 5/2009 | Snoddy et al. | |
| 2010/0100905 A1 | 4/2010 | Sequeira | |
| 2010/0207937 A1 | 8/2010 | Trothe | |
| 2011/0064388 A1 * | 3/2011 | Brown | G06T 13/20 386/285 |
| 2011/0119058 A1 | 5/2011 | Berard et al. | |
| 2011/0279445 A1 * | 11/2011 | Murphy | G06F 3/04842 345/419 |
| 2011/0311199 A1 * | 12/2011 | Fay | G11B 27/034 386/241 |

* cited by examiner

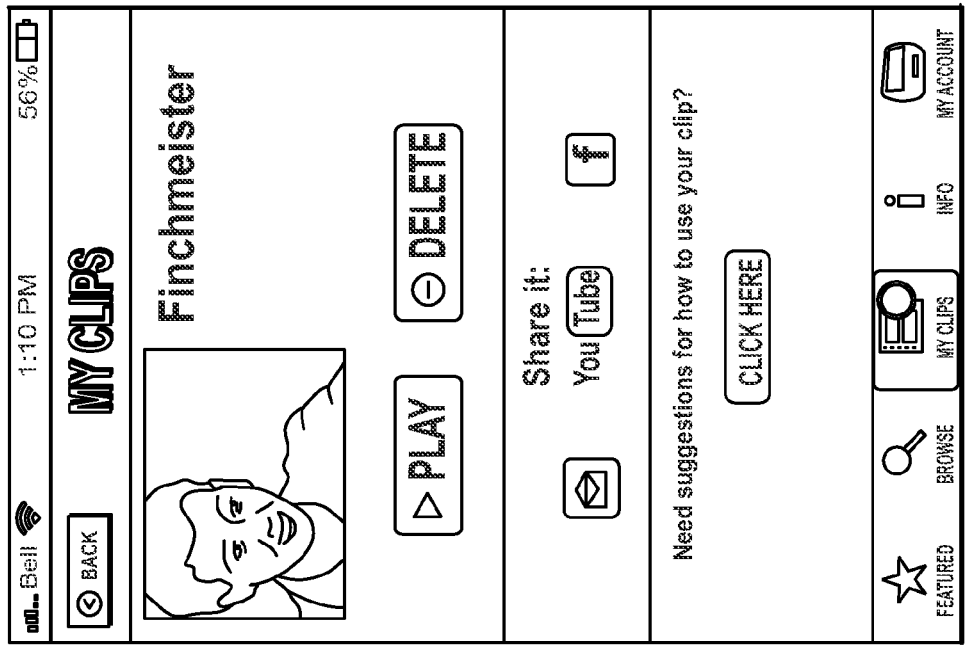
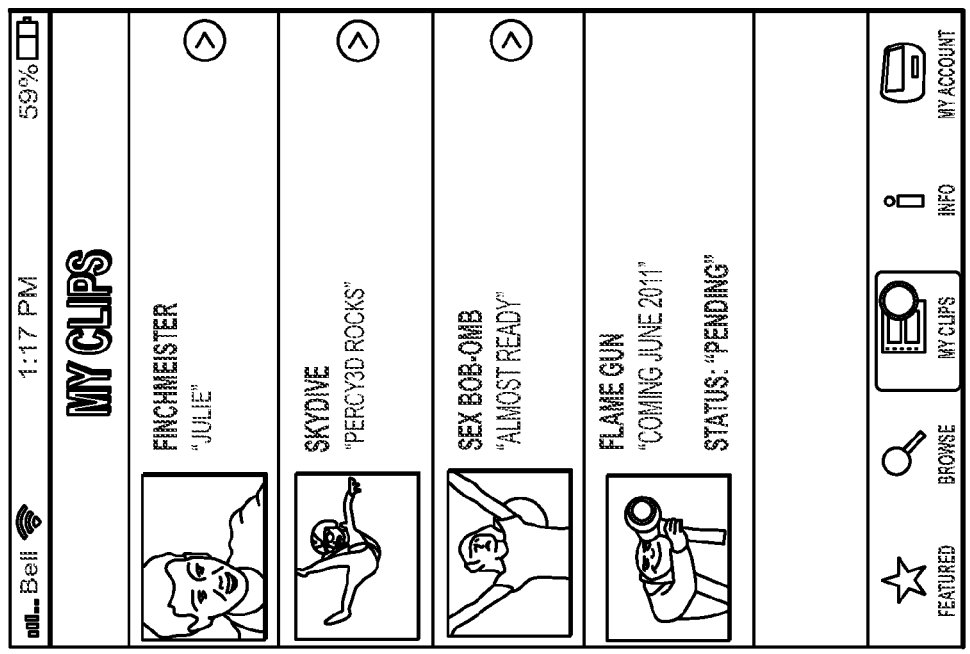

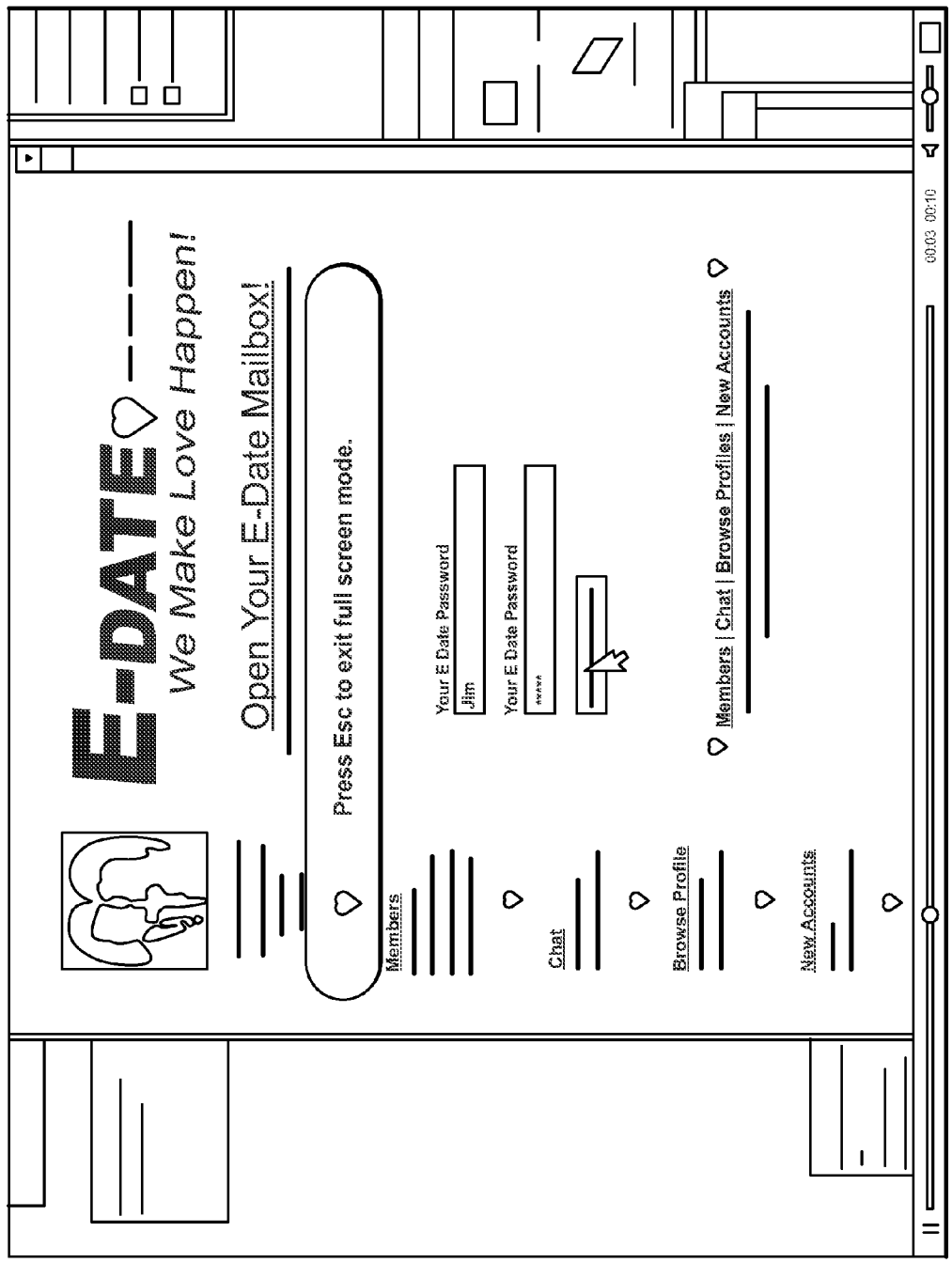

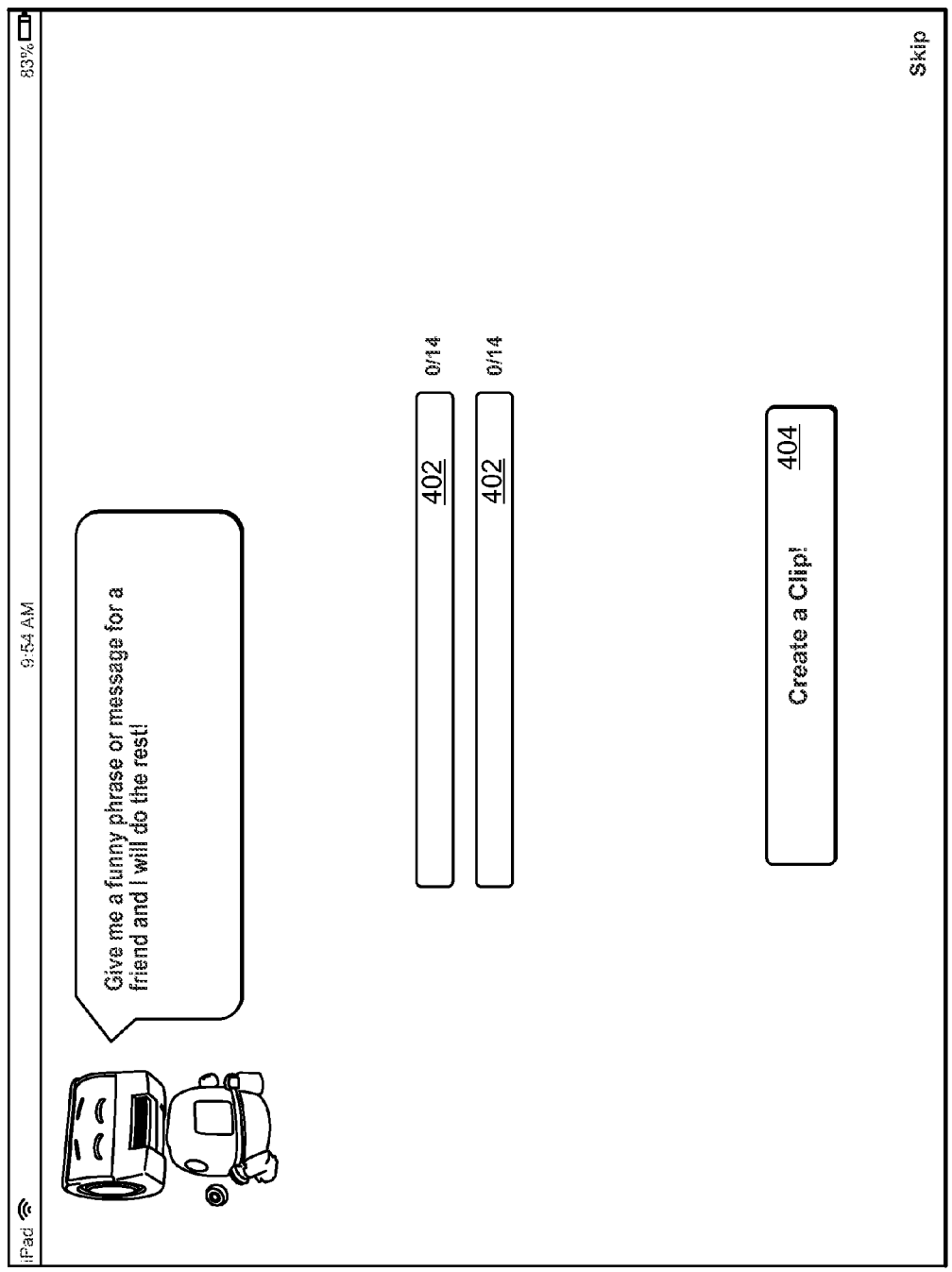

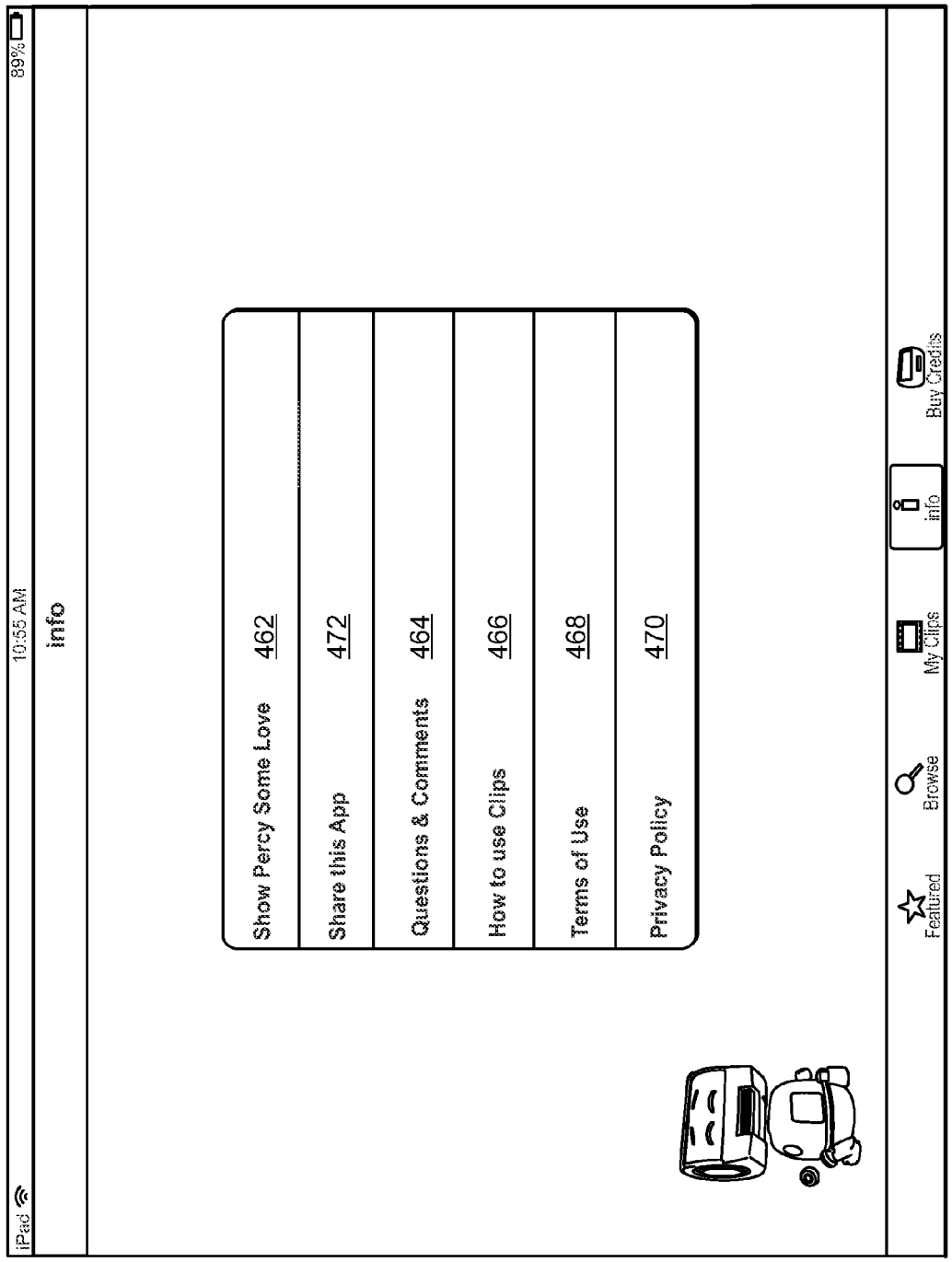

3D USER PERSONALIZED MEDIA TEMPLATES

CROSS-REFERENCE TO RELATED APPLICATIONS

This application claims priority to U.S. provisional Patent Application No. 61/505,757, filed Jul. 8, 2011 and entitled "3D User Personalized Media Templates," the entire contents of which are incorporated herein by reference.

FIELD OF INVENTION

This disclosure relates to the generation of personalized media.

BACKGROUND

With the advent of social media and smart phones, people are sharing information and media more than ever before. Friends can take pictures with their smart phones and email, text and post those pictures from their phones. Additionally, some people take pictures and add text or effects to the pictures on home computers, thereby personalizing the images. These additions of text effects to a flat, two dimensional media object are referred to as 2D media objects.

SUMMARY

The present disclosure relates to a system and method for providing users with three dimensional ("3D") user personalized media. The media can be clips or videos. The described embodiments encourage people to 'put yourself in the picture' using 3D visual effects and multimedia technologies. Users personalize clips from popular Hollywood movies or other user generated videos, and receive a custom video file that can be shared across the social web or downloaded to a computer or mobile device. Once a clip has been identified—such as iconic moments or memorable scenes in a movie—the disclosed system prepares a 3D visual effects template for customization and "marks" areas so that the personalization engine knows where to insert text and/or photos into the scene.

In one embodiment, the present disclosure relates to a system for providing personalized 3D media files. The system includes (1) a database of 3D media template files, wherein each template includes a personalization area; (2) a web server for receiving information from and providing information to a user, wherein the information includes a selected 3D media template file and text/photo, and for asset delivery (interstitials, preview videos and thumbnail images) to the user device; and (3) a media render for generating a personalized 3D media file based on the selected 3D media template file and the text. The system may also include (4) an account server for managing accounts.

In another embodiment, a method for providing personalized 3D media files includes (1) providing a plurality of 3D media template files, wherein each template includes a personalization area; (2) receiving information from a user, wherein the information includes a selection of a 3D media template file and text; (3) generating a personalized 3D media file based on the selected 3D media template file and the text. Artists create these files on workstations and the files are stored on a storage area network (SAN) for use by renders.

In one embodiment, the personalized 3D media files are generated using a computer farm. The farm comprises a plurality of render and encoder servers. Each server has workers that can serve as a scheduler for scheduling work flow. The work flow comprises rendering of the personalized 3D text or photos by generating a plurality of 3D text frames or photo frames and concatenating the rendered personalized 3D text or photo frames with the standard portion of the video. Each of the workers can either be an admin (scheduler) or render/encoder worker. Once an admin worker finishes the scheduling tasks, the admin worker will assign himself a task (or tasks), perform the task(s). When a render/encoder worker finishes his task(s) and if there is no admin worker assigned he will appoint himself as the scheduler. The process continues until all jobs are complete.

As used throughout this specification, 3D refers to three dimensional effects, for example, effects that depict movement in the x, y and z directions. The 3D effects of the present disclosure can be contrasted with composited, flat two dimensional (2D) effects.

In one aspect, the present disclosure relates to a method for providing a user with three dimensional user personalized video. In some embodiments, the method includes providing, from a web server, a user with a selection of video clips stored on a storage area network; receiving at the web server a selection of a video clip; receiving at the web server data from the user, wherein said data can be a plurality of symbols to personalize the video clip; rendering, using a rendering module, a three dimensional personalized video clip using the selected movie clip and the plurality of symbols; and providing, from the web server, the three dimensional personalized video clip to the user.

In some embodiments, the plurality of symbols include numbers, characters, images or a combination of numbers, characters, and images. In some embodiments, the video clip stored on a storage area network includes one of a movie clip, a television clip, or a user generated video. In some embodiments, the method includes storing the three dimensional personalized video clip in memory. In some embodiments, the video clip stored in the database includes a three dimensional visual effects template comprising marked areas of the video clip for later personalization. In some embodiments, rendering the three dimensional personalized video clip includes the rendering module inserting a plurality of three dimensional symbols generated from the plurality of symbols into the marked areas of the three dimensional visual effects template. In some embodiments, rendering the three dimensional personalized video clip includes the rendering module generating a plurality of three dimensional symbol frames and concatenating the plurality of three dimensional symbol frames with the remainder of the video clip.

Another aspect of the present disclosure relates to a method for preparing a video clip for three dimensional personalization. In some embodiments, the method includes selecting a video clip from a selection of video clips stored on a storage area network; preparing at a web server, a three dimensional visual effects template for the video clip; marking areas of the video clip for personalization; and storing the marked three dimensional video effects template in memory. The marking is done by the artists on their workstation. The particular frames are defined within a configuration file for a particular campaign. Each campaign has their own unique configuration file. A copy of this file is stored on each render and encoder machine.

Another aspect of the present disclosure relates to a system for providing personalized 3D video clips. In some embodiments, the system includes a database of video template files, wherein each video template file comprises a personalization area; a web server for receiving information from and providing information to a user, wherein the information received from the user can be a selected video clip and a plurality of symbols for personalization of the selected video and the information provided to the user includes a personalized three dimensional video file; and a media render for generating the personalized three dimensional video file based on the selected video template and the plurality of symbols. In some embodiments, the system includes an account server for managing a plurality of user accounts. In some embodiments, the render can be a computer farm. In some embodiments, the computer farm includes a plurality of render servers and encoder servers. In some embodiments, one of the plurality of render servers and encoder servers can be a scheduler for scheduling work flow of the remaining render and encoder servers, wherein the remaining render and encoder servers can be worker servers. In some embodiments, the scheduler is configured to schedule tasks for the worker servers and to schedule one or more scheduler tasks for the scheduler, and to perform the one or more scheduler tasks. In some embodiments, the scheduler is configured to, upon completion of the one or more scheduler tasks, if no other workers have assumed a role of scheduler, resume the role of scheduler and schedule additional tasks for the workers and for the scheduler. In some embodiments, each of the worker servers is configured to assume a role of scheduler as a new scheduler, in place of the scheduler. In some embodiments, the scheduler is configured to, upon completion of the one or more scheduler tasks, if another worker has assumed a role of new scheduler, the scheduler is configured to set a status of the scheduler to worker, and to receive scheduled tasks from the new scheduler.

DESCRIPTION OF THE FIGURES

FIGS. 3A-3C are screenshots of personalized media files according to embodiments of the present disclosure.

DESCRIPTION

A user can access a plurality of 3D templates through an application on his/her mobile device or from a web browser interface. The templates may be generated videos or excerpts from movies or televisions shows. Each template has a location for the placement of personalized text. Personalized text, supplied by the user, is applied to the video to create a 3D effect for the user. Once the user creates the template, the clip is downloaded to his or her device and then can share the personalized file with friends or family through email and social media applications, for example, FACEBOOK® and YOUTUBE®.

Figure 1A:
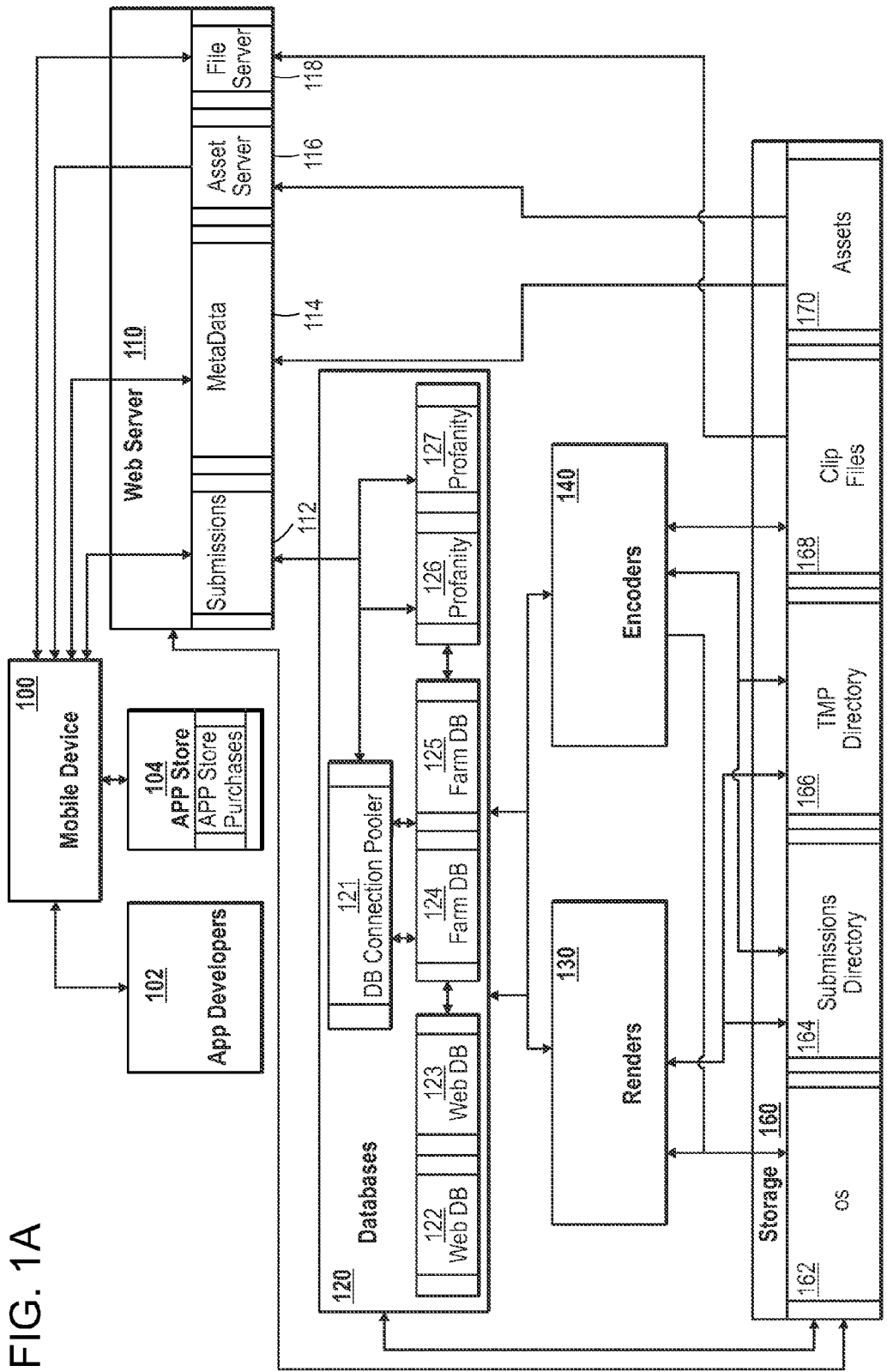
FIG. 1A is a block diagram of the system for generating 3D user personalized media templates according to an embodiment of the present disclosure.

FIG. 1A is a block diagram of the system for generating 3D user personalized media templates according to an embodiment of the present disclosure. The system includes a mobile device 100, an application developer system 102, an application store system 104, a web server 110, a database 120, render 130, an encoder 140 and storage 160, which may be a storage area network.

Mobile Device

The mobile device 100 can be any device that permits access to the web server 110, the application developer system 102 and the application store system 104, preferably via a wireless connection, e.g., a cellular or Wi-Fi connection. For example, the device can be a smart phone, e.g., an IPHONE®, an ANDROID® phone, a BLACKBERRY® phone or a WINDOWS® phone. The device also includes memory for storing personalized media clips or files. In some embodiments, the device can be a personal computing device, for example, a computer or a tablet, using a web browser. In some embodiments, the device can be connected to the web server 110, the application developer system 102 and the application store system 104 through an internet connection.

Application Developer System

The mobile device 100 can be connected to the application developer system 102 through an internet or cellular connection. The application developer system 102 validates the particular device and the user. Also, the application developer system 102 can collect data, for example, submissions by the user and the corresponding costs of each of the submissions. The cost data can be used for royalty payment determinations. Additionally, when new updates are available, for example, new videos for personalization, the application developer system 102 can notify the user of those updates. In other embodiments, the functionality of the application developer system 102 can be included in the web server 110. The application developer system 102 also can confirm that the user has available credits to purchase media files.

Application Store

The mobile device 100 is connected to the application store system 104 through an internet or cellular connection. The application store system 104 provides the application to users via download and provides a portal from the mobile device 100 to the web server 110. The application store system 104 also handles the purchasing of media by the user.

Web Server

The web server 110 is connected to the mobile device 100 through an internet or cellular connection. The web server 110 also is connected to the database 120 and to storage 160. The web server 110 includes a submissions subsystem 112, a metadata subsystem 114, an apache asset server 116, and a file server 118.

Submissions

The submissions subsystem 112 authenticates submissions, validates submissions and monitors submissions for profanity. A submission is the package that a user submits to the database to request work to be performed, e.g., the submission can include a template selected by the user and the personalization text. That package contains a set of tasks, sometimes referenced as atoms in this disclosure, as well as the requirements for performing those tasks. The requirements may include dependencies between submissions, dependencies between atoms, input parameters for each atom, and the resources required by each atom.

Each submission from a user has a submission code, which is used to access the resources for a submission. The submission code is returned when a processing request is successfully accepted by the web server 110.

The web server 110 implements a Representational State Transfer ("RESTful") or Resource Oriented Architecture ("ROA") interface for submitting requests for media processing and for retrieving the results of that processing. A mobile device 100 can use php+curl libraries to easily interact with the web server 110 behind the front face of the application on the mobile device.

Media file templates available to the user from the web server 110 are grouped according to campaigns. A campaign is a clip or file with specific characteristics associated with it. The campaigns are grouped into titles. For example, STAR WARS® movies can be the title and the title can include multiple campaigns or video clips from the STAR WARS® movies. BACK TO THE FUTURE® movies can be another title and can have a plurality of campaigns. Each campaign has a unique campaign code. The resources for the campaign are accessed using the campaign code in the uniform resource identifier ("URI") sent to the web server 110. Each campaign has separate parameters and requirements. Each campaign is an approximately 10 second video clip in some embodiments. In those embodiments, each campaign can have about eight seconds of standard video footage, for example, a memorable scene from a movie. The campaign in these embodiments also has two seconds of personalized 3D text. The renders and encoders, discussed below, create the two seconds of personalized 3D text within the video and combine the two seconds of personalized text with the eight seconds of standard footage to create a personalized 3D movie clip for the user.

The web server 110 can perform several operations.
1. It can receive submission requests from a user for processing and returning the submission code for the submission.
2. It can indicate whether media associated with a request are readily available.
3. It can return media associated with a submission if they are readily available.
4. It can provide a catalog of available titles and campaigns for a specific client id whether for a specific language or as a full dump.
5. It can provide RSA keys for a certain campaign.
6. It can provide a web formatted version of a Terms and Conditions and Privacy policy.
7. It can serve assets.
8. It can serve media data.

Submitting Requests to the Web Server

A user can select a template video clip from within a campaign or a title. Then, as described in more detail below, the user fills in a hypertext markup language ("HTML") form the user's personalization information, for example, "Happy Birthday Bill." Then, the web server 110 authenticates both the user, i.e., the mobile device 100, and the submission. As discussed below, the web server 110 sends an authentication token to the mobile device 100 to ensure that the user is the user who downloaded and registered the application on the mobile device 100. Additionally, the submission itself is authenticated, as described below, to ensure that the submission complies with profanity standards, has the correct information, and the text complies with the length requirements. Once the web server 110 authenticates both the user and the submission, the web server 110 sends the user a confirmation of receipt and compliance.

Clients can submit new requests to the server by using a message with a POST method to the address. For example:
uri:=123.45.56.789:XXXX/campaign/<campaign_code>

The encoding type of the body should be multipart/form-data, containing the media required for the processing to occur, according to the requirements of the specific campaign. The format of the body is similar to the format of a regular form submission, as described by the HTML standard. Also, the authentication headers are calculated and inserted before sending the message to the web server 110.

The contents of the submission are verified. For example, when the user wants to personalize a video clip with a photograph, photos larger than a prescribed size, such as 400 KB, can be rejected, not forwarded. Text fields are verified as well. The length of the text field and the length of each word in the field should not exceed the limits set by the specific campaign. The contents of the text fields are filtered to reject profane or offensive messages once they reach the web server 110.

The submission from the mobile device 100 to the web server 110 can be in a POST (HTTP) message. POST is one of many request methods supported by the HTTP protocol used by the World Wide Web. The POST request method is used when the client needs to send data to the server as part of the request, such as when uploading a file or submitting a completed form. The POST message from the mobile device 100 to the web server 110 should have accurate content-length headers. The POST message also should contain an accurate date header.

The elements of the POST message should have the correct content-types. For example, if the campaign calls for a file of content-type image/jpeg, then the POST message should have that content-type for the element that represents the binary data of the image. One could simply hard-code the content-type, however, the system asks that the file type be confirmed as part of the validation process to avoid users from submitting random file types and having them reach the rendering process before that bad file type is detected. PHP, a general purpose scripting language, has two functions that can be used to validate images: getimagesize( ) and exif_imagetype( ). As part of the validation process, these functions can be used to check uploaded files to make sure they are of the correct image types. When they are included as part of the POST submission, the correct content-type for the file should be specified. Using the generic content-type, application/octet-stream may result in a rejected submission.

The POST message also should contain an authentication code in the header, calculated as described in the next section.

The body of the response sent back to the mobile device 100 from the web server 110 will contain a base32-encoded submission code on the first line. Subsequent lines of the message body will contain URIs, one for each default media type that will be available when processing completes. In other embodiments, additional media formats are supported by a campaign, but these will only be processed on demand; whereas the ones listed in the body of the submission response may have higher availability. Additionally, upon successful submission the Application Programming Interface ("API") returns to the user a JavaScript Object Notation ("JSON") dictionary with a time_to_render key which indicates how long the average time for a render of the particular campaign takes to finish along with the list of uniform resource locators ("URLS") pertaining to each supported video format. The interstitials body of the response helps to provide a waiting screen containing multiple slides while the request is processed. Interstitials may contain, for example, 1 image specific to the movie title related to the submission. For example, the response might be in the form:

```
{
    "DKR4ATIXTY55QLV2U7YLDDOB": {
        "interstitials": {
            "en-us": [
                "http:// 123.45.56.789:XX/interstitials/en-us/minute/percy3d_stand-by-5_v1.jpg",
                "http:// 123.45.56.789:XX/interstitials/11/2263_05363_1.jpg",
                "http:// 123.45.56.789:XX/interstitials/en-us/howto/percy3d_panel_3_laugh-blush_v01.jpg",
                "http:// 123.45.56.789:XX/interstitials/en-us/love/percy3d_panel_1_movies-3_v01.jpg",
                "http:// 123.45.56.789:XX/interstitials/en-us/personalize/percy3d_panel_2_personalize-2_v01b.jpg",
                "http:// 123.45.56.789:XX/interstitials/en-us/share/percy3d_panel_5_share-3_v01.jpg",
                "http:// 123.45.56.789:XX/interstitials/en-us/direct_to/percy3d_panel_6_url-3_v01.jpg"
            ]
        },
        "time_to_render": 60,
        "urls": [
            "http://123.45.56.789/asset/ap03/DKR4ATIXTY55QLV2U7YLDDOB/flv",
            "http:// 123.45.56.789/asset/ap03/DKR4ATIXTY55QLV2U7YLDDOB/mp4",
            "http:// 123.45.56.789/asset/ap03/DKR4ATIXTY55QLV2U7YLDDOB/webm"
        ]
    }
}
```

In some embodiments, a base36 encoded string or guid can be used. In this embodiment, the response can contain ssl_urls to help support ssl enabled devices. The response can contain a key "submid", to better parse the submission code or id. For example, the response might be in the form:

```
{
    "ea87f8de-3e68-4633-b9fc-6c7ae661dc7b": {
        "interstitials": {
            "en": [
                "http://123.123.12.123:xx/interstitials/en/minute/percy3d_stand-by_v1.jpg",
                "http://123.123.12.123:xx/interstitials/en/howto/percy3d_panel_3_boss_v01b.jpg",
                "http://123.123.12.123:xx/interstitials/en/direct_to/percy3d_panel_6_url-2_v01_584_438.jpg",
                "http://123.123.12.123:xx/interstitials/en/share/percy3d_panel_5_share-3_v01.jpg",
                "http://123.123.12.123:xx/interstitials/en/personalize/percy3d_panel_2_personalize_v4b.jpg",
                "http://123.123.12.123:xx/interstitials/en/love/percy3d_panel_1_movies_v04b.jpg",
                "http://123.123.12.123:xx/interstitials/17/2275_00732_1.jpg"
            ]
        },
        "submid": "ea87f8de-3e68-4633-b9fc-6c7ae661dc7b",
        "time_to_render": 60,
        "urls": [
            "http://123.123.12.123asset/ff01/ea87f8de-3e68-4633-b9fc-6c7ae661dc7b/flv",
            "http://123.123.12.123/asset/ff01/ea87f8de-3e68-4633-b9fc-6c7ae661dc7b/mp4",
            "http://123.123.12.123/asset/ff01/ea87f8de-3e68-4633-b9fc-6c7ae661dc7b/webm"
        ],
        "ssl_urls": [
            "https://123.123.12.123:xxxx/out/ff01/2012-04-19/ea87f8de-3e68-4633-b9fc-6c7ae661dc7b/ff01_ea87f8de-3e68-4633-b9fc-6c7ae661dc7b.flv",
            "https://123.123.12.123:xxxx/out/ff01/2012-04-19/ea87f8de-3e68-4633-b9fc-6c7ae661dc7b/ff01_ea87f8de-3e68-4633-b9fc-6c7ae661dc7b.mp4",
            "https://123.123.12.123:xxxx/out/ff01/2012-04-19/ea87f8de-3e68-4633-b9fc-6c7ae661dc7b/ff01_ea87f8de-3e68-4633-b9fc-6c7ae661dc7b.webm"
        ]
    }
}
```

Profanity Filter

During the submission process the system filters text inputs for profanity. In some embodiments, the system uses a third party profanity filter. In the case where a user may submit bad text the response is a status of 406 with a body containing a dictionary keyed with the input names and a list of offensive material.

For example, assume one of the field names in the campaign is 'lineone' and the user entered a profane word. The resulting response would contain a body field with the appropriate error message, a highlight field showing which field name contains the profane content and a title for the client to use when alerting the user of the error:

{"body": "Please adjust your text. Profanity will not be accepted.", "highlight": "lineone", "title": "Error"}

Campaign Authentication

As discussed above, the web server 110 authenticates the submissions. For example, the web server 110 can use digital signature authentication for each POST submission to the web server 110. Digital signature authentication is a form of secure communication based on public/private key cryptography. The message sender has a signing key which is secret.

The receiver has a verifying key which is public. The sender creates a message and applies the signing key to it to create a signature. The unencrypted message is sent to the receiver with the secure signature attached. The receiver uses the verifying key with the signature to determine whether the message has been altered.

One exemplary cryptography standard for digital signatures is the RSA PKCS1-SHA1. This standard is available for most platforms, including php 5.2.x builds which include the open secure sockets layer ("SSL") modules. In order to improve security, the message is passed through a SHA-256 hash first; then, the hash of the message is passed to the RSA PKCS1-SHA1 pipeline. This provides for secure signatures given modern computing power and known attacks against RSA. The process is to hash the message first with SHA-256; then, sign that hash with RSA PKCS1-SHA1. This is usually two function calls in most cryptography libraries.

The message of the digital signature authentication approach consists of the campaign code and the value for the HTML header, Date, concatenated with a colon separator:
message:=<campaign_code>+':'+<date_header_content>

This message is signed with the signing key provided to the user for the particular campaign.

The signature returned from the signing function can be binary but is not necessarily distinguished encoding rules ("DER"). In order to embed the signature in the submission, the binary version of the signature may then be base64 encoded so it becomes safe to include in the American Standard Code for Information Interchange ("ASCII") message.

This is how an authentication code is produced for each submission. Using php/openssl, the system may use the hash( ) function for the SHA-256 hash, and openssl_sign( ) function for the RSA PKCS1-SHA1 signature. Also, the base64_encode( ) function helps with base64 encoding. The resulting signature may be used in the HTML header, Authorization, in the following manner:
authorization_header_content:="P3v0001"+<base64_signature>

Other embodiments of the authentication scheme may use different tokens, 'P3v0096' for example. If the date header is omitted from the submission, or if the date specified differs from the time on the server by more than 90 minutes, then the request can be rejected. The time on the server is synchronized to time servers around the world, so it will be accurate. If the signature is not valid for the particular campaign or campaign start-end dates, then the request can be rejected.

As an additional security measure, every public-readable directory on the client application or website can either have a valid index file (index.php, index.html) or an empty index.html file to prevent the public from browsing the client php source code for the website.

While exemplary authentication and security features have been described herein, any known authentication or security mechanism known to one of ordinary skill in the art could be substituted for the described embodiments.

Client Authentication

Additionally, the web server 110 authenticates the client, i.e., the mobile device 100 associated with the user. Client authentication is performed on all requests. The web server 110 provides a universally unique identifier ("UUID") type application key to user. The key is part of an MD5 message digest algorithm hash created using the date as specified within the 'Date' header and a secret salt which will also be provided by the web server 110. There's also another header, P3-APP-ID, that will contain a combination of application key and hash separated by a colon.

Example

27a36120-3ebb-11e0-9207-0800200c9a66:
6714e5808b2ab9a0a814283a3d370147

To generate the hash the following formula may be used:
Uuid:date:salt

A sample header may look like:

```
{
'User-Agent':'Python 2.6.4 httplib module',
    'Date': 'Tue, 15 Mar 2011 17:05:13 -0000',
    'P3-APP-ID', '27a36120-3ebb-11e0-9207-0800200c9a66:6714e5808b2ab9a0a814283a3d370147'
}
```

Requesting Media from the Web Server

To receive media associated with a submission, the client may submit a message with a GET method to a URI of the form:
URI:=123.45.56.789:8080/asset/<campaign_code>/<submission_code>/<format_code>

The campaign code and submission code have been discussed earlier. The format code indicates one of the types of media associated with the campaign. For example, for campaigns involving video deliverables, the format code might be mp4 for an MPEG4 standard file, or flv for an Adobe Flash video file. The format codes supported by a campaign vary among campaigns. If the server responds with a 503 (service unavailable) return code, then the client should read the Retry-After header to determine how long to wait before retrying the request. In some cases, the media may still be processing, so a few extra seconds will be required before the media can be accessed.

In some cases, the client may simply want to know whether the media is available, without actually requesting that it be delivered. In this case, the GET method can be replaced with the HEAD method. The rest of the HTML message remains the same. If the deliverable is not available, then a 503 code will be returned, with a Retry-After header to indicate the number of seconds to wait before the media may be available. As with a GET, a HEAD message may trigger time-intensive calculations on the web services server, such as transcoding from one format to another; so messages preferably are not sent unless there is an intent to (eventually) access the data.

There is no authentication on requests to retrieve media from the server. This allows media to be shared without the need for sharing authentication credentials to everyone, such as signing keys which should remain private. In some embodiments, the web server 110 will allow clients to delete submissions that they no longer wish to make available.

Metadata System

The metadata system 114 includes data on languages, campaigns, terms and thumbnails. The metadata system 114 contains data with which a user can interact. For example, the user can interact with thumbnails stored within the metadata system. The metadata system 114 accesses data from the web database 122 to display this data to the user. The data can include the catalog of titles, campaigns, categories, languages, and content. The metadata system 114 also contains information to support a particular title within a catalog and links to images and video previews (thumbnails).

Apache Asset Server

The apache asset server 116 is in communication with assets database 170 in the storage 160. The apache asset server 116 contains and displays the catalog of available video clips to the user. From this catalog, the user can browse the various video clip templates and select which video clip to personalize with his/her own text. The video clips are stored in the assets database 170 of the storage 160.

File Server

The file server 118 is in communication with clip files database 168 in storage 160. The storage 160 stores completed user personalized videos.

Database

Figure 1B:
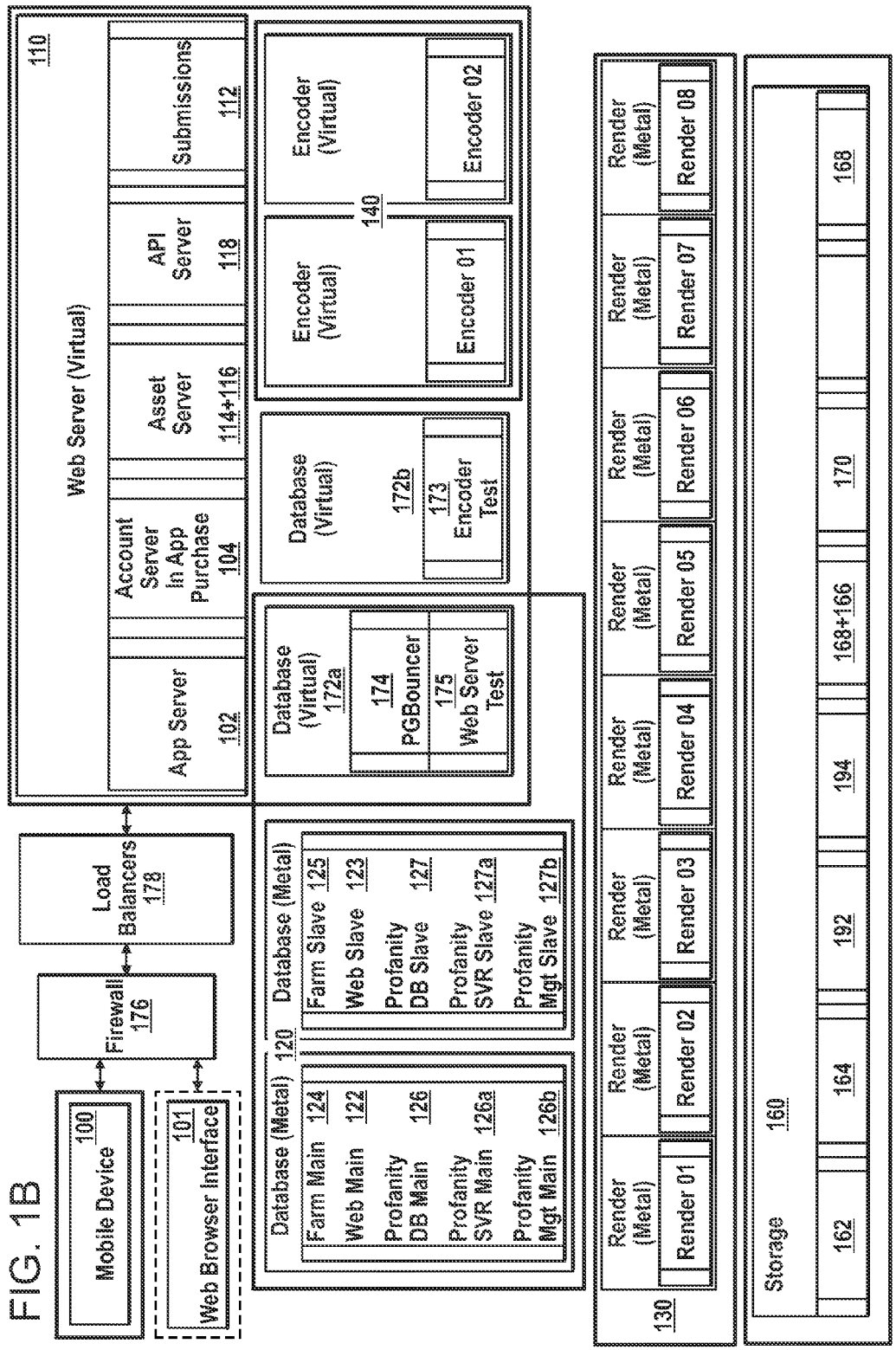
FIG. 1B is a block diagram of the system for generating 3D user personalized media templates according to an alternative embodiment of the present disclosure.

The database 120 is connected to the web server 110, the render 130, the encoder 140 and the storage 160. In some embodiments, a pgBouncer can be used as a database connection pooler 121. pgBouncer can handle all port connections between the web server 110 and the databases 124, 125. Rather than creating a new connection to the database every time a database query needs to be performed, finite amount of persistent connections to the database are set in pgBouncer and those connections are used to perform the queries instead. The database 120 includes a plurality of web databases 122, 123; a plurality of farm databases 124, 125; and a plurality of profanity databases 126, 127. The profanity databases 126, 127 contain data and algorithms to filter submissions for profane language and communicate with the submissions subsystem 112. In some embodiments, the two sets of databases in database block 120 correspond to a main system and a slave system, as shown in FIG. 1B. If at any time all or part of the main database systems 124, 122, 126 fail, all or part of the slave database system 125, 123, 27 is used. For simplicity, this disclosure generally refers to just the main database system. The submissions are saved in both the web database 122 and the farm database 124. The web database 122 communicates with the submissions subsystem 112. The web database 122 contains the data that creates the catalog, which is displayed through the metadata system 114. It records incoming requests for submission and the submissions themselves, and input text that the user places in the form when the user submits. The web database 122 contains a list of titles, clients, campaigns, and lists of which clients are able to view which titles in the catalog.

The farm database 124 communicates with the renders 130 and with the encoders 140. The farm database 124 keeps the schedule of tasks which the encoders and renders are scheduled to perform.

Workers

The system contains a collection of workers, e.g. servers, including one or more renders 120 and one or more encoders 140. The renders and encoders are referred to as workers. In one embodiment, render 130 contains nine separate renders. Encoder 140 can include a plurality of encoders, for example, two encoders. However, in some embodiments, there can be any number of encoders and renders required to create user requests.

At a high level, when a submission comes to the farm database 124 through the web server 110 to personalize a selected video clip template, the video clip template may be a 10 second video, of which two seconds of the video will be modified to create the personalized video. In some embodiments, videos are made up of 24 frames (images) per second. Accordingly, 48 frames of the video would need to be modified.

The system of workers, encoders and renders, is used to create the 48 frames and combine those frames with the remainder of the video. Instead of having one dedicated server or worker for scheduling the rendering and encoding, the present system allocates one worker, among the plurality of workers, as a scheduler. The scheduler splits up the 48 frames among the workers to optimize the speed and performance of the video generation. In some embodiments, one worker is not always designated as the scheduler and there is no central server that selects the scheduler from the plurality of workers. Instead, once a worker has finished its tasks, either rendering or encoding, the worker checks to see if another worker is currently the scheduler. If no other worker is a scheduler, the worker then becomes the scheduler. Once the scheduler has finished scheduling for the other workers, it can begin scheduling for itself. Once it schedules for itself, it begins working and no longer is the scheduler. The scheduler uses a first in-first out method of processing jobs. In some embodiments, the scheduler is an encoder, because the encoders tend to be less busy than the renders. Below, the renders and encoders and their functions will be discussed in more detail.

Renders

The renders 130 replace template text or photos with the specific, personalized text or photos submitted by the user. The renders 130 fill in the location in the video with the text or photo, over the background/template canvas. This process involves two steps (1) creating the 3D text and (2) compositing the 3D text or photo with the background. Note that each frame that includes the 3D text or photo may be different because the text or photo moves in 3D space. Accordingly, the render may need to alter 48 frames of the video to create the personalized video. This process of creating the text or photo in 3D space and overlaying it on the background involves rendering.

A render farm is also known as a job scheduler or batch processing system. The render farm performs pre-defined tasks using a dedicated resource of machines. A render farm is used to coordinate the activities of machines, in order to schedule high-priority work over low-priority work, to report and log issues as they occur, and to make effective and timely use of resources.

The disclosed render farm is optimized for short-running jobs, as required by the web server 110, and is tailored for easy deployment to resources such as cloud servers. In some embodiments, the render farm includes the following characteristics in comparison with conventional render farms:

Security: some render farms require pre-registration of IP addresses of worker machines as a configuration step. Dynamically adding new machines is not a simple process. This limits the ability to operate in the cloud. Because the farm operates in a "safe" environment, many of the security features that are standard in many other solutions are omitted.

Task Network Flexibility: some render farms perform only a pre-defined network of tasks. In other words, the network of tasks cannot change on a per-submission basis. This is not sufficient for visual effects work, where one execution may require simulation and lighting and compositing tasks to be performed, but the very next execution may be able to skip the simulation task. It may be practical to "pick up" frames that failed initially by queuing up the render tasks for just those failed frames.

Some embodiments use dynamic networks, even if each individual task within those networks is pre-defined.

Decentralized: the common design for a render farm is a centralized master server which conducts all the scheduling operations, with a database server behind it and a number of worker server in front to perform the tasks submitted. With this design, scalability of the system is limited to the scalability of the master server. In the design of the present farm, the master server is eliminated so that worker servers talk directly to the database back end. While this may incur some expenses (e.g., polling may be required for some operations as opposed to triggering) it reduces the problem of scalability to one of scaling the database.

Easy: the system is self-sustaining and requires minimal management attention. For example, the historical tracking system (the log module) degrades gracefully over time, so that it only ever requires a fixed volume of space and so that an administrator need never enter the database to clean out old logs.

Python: The farm is written in python to increase the pace of development; whereas most batch processing systems are implemented in lower level languages such as C++ or Java.

Minimal dependencies: Preferably, a python-only dependency will be favored over a compiled-and-integrated dependency. In some embodiments, it may be easier to produce cloud server image instances if the dependencies are kept sparse.

Worker & Host

A worker is a server that can perform tasks that users request of it. A worker can be implemented in a python process object. Any number of workers can be instantiated on the same machine instance, as long as they are given unique ports upon which to communicate. The multiple workers will cooperate and share the resources available to that machine gracefully.

In one embodiment, each worker process requires about 15 MB of RAM to operate. The expected usage is that a startup script located locally on each server will execute and create a number of worker processes to perform tasks. The number of worker processes instantiated should relate to the limit on the number of tasks expected to execute concurrently on the machine. There are benefits to not instancing more workers than the system expects to use; otherwise, the scheduling will inefficiently try to schedule workers that will never receive work.

Workers are state machines, but the state that the database sees and the true state of that worker may be slightly different. This is particularly true of certain state transitions that should be performed with great care (such as entering administration state, which will be discussed next). Workers also receive messages through their state as recorded in the database. So, for example, states of 'stop' and 'kill' indicate than an external entity has asked the worker to stop (graceful, eventual shutdown) or die (hard, immediate shutdown). When the worker has reacted to these requests (and shutdown), the state in the database changes from 'stop' or 'kill' to 'down' or 'dead' respectively.

Administrator

The design of the farm database is masterless, meaning that workers connect directly to the database. However, some scheduling is still performed. In some embodiments of the farm database each worker schedules tasks for itself. However, this can be inefficient.

In another embodiment, one idle worker enters an "administration" state. It is unlikely for two workers to enter into the administration state at the same time, but it is possible when the database server is under a high load. As a result, operations within administration mode are coded to be efficient when one administrator is operating, but also safe when more than one is operating. The farm database server 124 stores a table of the tasks for each worker and keeps track of which worker is currently the administrator or scheduler. Each time a worker finishes a task and has the possibility of becoming an administrator, the worker checks with the table in the farm database 124 to see if another worker is already an administrator, thereby avoiding having two administrators at once.

In the administration state, the server performs a number of maintenance tasks. One of these tasks is scheduling. In some embodiments, a server will leave the administration state reluctantly, in order to minimize the number of state changes written to the database. At periodic intervals (e.g., approximately 1.5 s) the administrator will cycle through its chores, including scheduling work to workers. If necessary, the administrator will schedule work to itself, leaving the administration state and entering a 'busy' state. As a result, a fully loaded farm has no "overhead" in the sense that no master server is sitting idle; all servers are performing user-requested work except the database server, which continues to coordinate activity. The first worker to finish its work is likely to enter the administration state and schedule additional work to itself.

In the event that the administrator crashes, its demise will be detected when its heartbeat expires and another worker will become the new administrator. As long as one worker remains alive in the system, it will be able to enter the administrator state and issue work even if only to itself.

Atom, Atomtype, Atom Server

As introduced in the last section, a submission is a container of atoms. An atom is the smallest unit of work. In one embodiment, a worker can execute only one atom at a time, so each server is likely to be running several workers. An atom has associated with it dependencies, parameters and resource requirements. The term 'atom' has some similarities to other terms such as job, execution, task, process, etc. which are more common nomenclature used in other systems.

Dependencies allow some atoms to be held until other atoms are completed. For example, encoding a video stream must be held until the input frames are produced; encoding atoms will have dependencies that rendering atoms must execute first.

Parameters can be anything. In one embodiment, the python data structure is passed through the system. Resource requirements must be defined relatively to pre-existing resources in the system. Each atom can have a valid pre-defined atomtype. This may be the only layer of security in the system. Unless the system includes a "command" atomtype that allows a user to execute an arbitrary command, then exposure to attack is limited. An adversary making a submission with ill intent can only perform the operations defined by an atomtype because the atoms of that submission can only perform tasks that have been pre-defined with an atomtype.

Physically, an atomtype is a block of python code which lives in a pre-defined location on disk. The worker needs to know the path to the configuration area at startup in order to find the atomtypes defined for the system. When a worker receives the order to execute an atom, it spawns a new process, known as an atom server. The atom server reads the atomtype script in-line and thereby executes its contents. The parameters to the atom are available to the script through variables that are pre-defined and passed into the scope of the atom server in which the atomtype script executes.

Atoms, like hosts, have states such as 'wait,' 'busy,' 'fail,' 'done,' etc. When an atom fails, the retry mechanism may try to execute the atom again, if it was submitted with a sufficient 'matrices' value. For example, if an atom is submitted with matrices of three, then it must fail to execute three times before the scheduler will cease to attempt to send it to a worker.

Resource

A resource is an abstract concept for the physical requirements of the work. It may be necessary to track how much RAM or how many CPU cores atoms use. These can be defined as resources. It may be necessary to track software licenses so that a limited software resource can be used to capacity without the risk of executions attempting to run when a license is not available. Software licenses can also be defined as resources.

Resources can either be node-locked or floating. When node-locked, they are associated with a particular IP address. All the workers at that IP address will share that resource. When floating, their address is designated with "*" and all the workers in the system will share them. Available RAM would be a resource that must be node-locked. A software resource could be floating if a floating license server is used, or could be node-locked if the software is installed on particular machines only.

If a server has a node-locked resource, then it will be limited to the capacity of that allocation even if "extra" capacity is available in the form of floating resources. In other words, when a server identifies that it has a node-locked resource, then the farm database does not consider floating pools of the same resource to be available when scheduling atoms to workers on that server.

Resources have types that are predefined. For example, to introduce a new kind of software license into the system, a new resource type is created, then that resource type is used to declare how much of that resource is available in the system. The system uses resource counts as stored in the database, it does not poll license servers to determine interactively what licenses are available. Furthermore, the farm database does not interrogate running atoms to determine whether or not they actually used (or exceeded) the resources that they claimed that they would use.

Reporter

The reporter is the user interface to the system. The reporter is a web server 110 gateway interface ("WSGI") application, so it uses a WSGI server under which to run. For small environments, the "simple_server" packaged with the standard python distribution is sufficient.

As a WSGI server, users access it through a web browser. Using Internet Explorer, for example, a user may select directories in the reporter UI and a file explorer will open at that location. This is particular helpful for navigating quickly to where logs are being written for the atom or submission.

Atomtypes

Atomtypes are "raw" blocks of code that are in-lined to another running process, rather than being true plug-ins or class instances.

An atomtype gets its name from its filename. Atomtypes should be saved in the atomtypes/subdirectory that all the workers are pointing to. If a worker fails to find an atomtype script for an atom that has been scheduled to it, then the atom will fail to execute. It is not necessary to edit a configuration file or perform any special registration to make the atomtype available to the system; as long as the system can find the file in the atomtypes/directory, then it will be able to use it. In some embodiments, the atomtypes are independent of the campaign, rather than having the campaign configuration files containing specific information on a campaign. In some embodiments, configuration files can be used and each farm server contains a copy of the configuration file. When configuration files are used, the configuration files may be centralized. The configuration files can include campaign specific information for specific jobs.

Encoder

The encoder 140 is connected to the farm database 124, a submissions directory 164, and a clip file storage 168. The encoder 140 performs the following steps in some embodiments: (1) takes the rendered frames and combines them together to make a media file, i.e., the 48 frames are put together in order—FFMPEG can be used to generate each media file; (2) the frames are then put in the support format of mobile device 100, i.e., MP4, flv and webm—both the MP4 and flv formats are generated for each job—if the device requesting the personalized video clip does not support the MP4 or flv format than the webm file will be created. During this situation all three formats are created; (3) the 48 frame files in both formats are stored in the TMP directory; (4) the static 8 seconds are concatenated with the two rendered seconds to create the full, personalized video clip in both the MP4 and webm versions, and MP4Box is used to concatenate all sections of the video clip to make one continuous video clip; (5) FFMPEG is used to wrap the MP4 file into a flv (flash) file; and (6) all versions (MP4, flash and webm) are stored in, for example, a SAN Out directory 192 in storage 160 (shown in FIG. 1B). The unrendered, unpersonalized video resides, for example, on SAN pbin directory 194 in storage 160 (shown in FIG. 1B). Once the video is created and stored in an Out directory, the rendered frames stored in the TMP directory are deleted. In other embodiments, not all versions are created each time.

The scheduler ensures that the rendering, encoding and deleting are performed and performed appropriately, e.g., the encoding is not performed prior to the rendering or before the rendering is complete. A table that resides in the farm database 124 keeps track of the schedule so that the encoder can know when to start combining the files.

The concatenation of the 48 rendered frames and the remaining static frames can be performed using open source software, for example, MP4 box or FFMPEG.

When the personalized video is ready and in the out directory, the database communicates with the file server 118—through the web server 110—to notify it that the video is ready. The file server 118 then notifies the application that the video is available. Then, the application downloads the video from the web server 110. In an alternative embodiment, the mobile device 100 can repeatedly ask the web server 110 if the personalized video is ready. The mobile device 100 does this until the video is ready and available for download.

Storage

Storage 160 includes the operating system 162, a submissions directory 164, a TMP directory 166, a clip files 168, and an assets database 170. The assets storage 170 stores all of the preview video clips that the user can preview before selecting which one to personalize. The TMP directory 166 stores the rendered frames prior to the frames being concatenated with the remaining frames from the video. The TMP directory 166 is in communication with the render 130. The submission directory 164 stores all the reused clips that are not personalized. This includes the 192 frames of a 240 frame (10 second) video clip where 48 frames are being personalized. An out directory 192 stores the final and personalized versions of the video. The out directory is in communication with the encoder 140 and the render 130. The OS 162 is the operating system that controls the web server 110, encoders 140, renders 130 and the database 120. The clip files storage 168 is in communication with the file server 118.

Catalog Implementation

The following section describes retrieval of the catalog available to the client, what parameters are expected, and the information passed back.

Query String Parameters language_code: The system can support a plurality of languages, for example, the seven languages described in the following table:

| Language | Code |
|---|---|
| French | Fr |
| German | De |
| Dutch | Nl |
| Spanish | Es |
| Italian | It |
| Polish | Pl |
| English | En |

The Result

Upon successful request, the API returns a JSON string of categories and adjoining titles, steps, and step parameters.

Each category will contain one or more titles. Each title contains one or more campaigns. A campaign corresponds in some embodiments to a movie clip. Campaigns are broken out into a story board concept where the campaign has 1-n steps. Then each step will contain 1 or more input fields (text inputs) and a single image.

Categories

Beyond its dictionary of titles, categories contain fields: category_name, the display name, category_id, order_num, type, current_type (paid or free), featured (to indicate whether to display the category in the featured section or not). "Featured" may be, for example, the 10 newest campaigns made available.

Titles

As mentioned above, titles contain a dictionary of campaigns. Other fields found are title_id and title_label.

Campaigns

Each campaign will contain a dictionary of steps. Other fields found in the campaign may include id, label, video_url, and social media keys. In some embodiments, the following file formats for the video are offered:

.flv
.mp4
.webm

The video_url is a list of urls for each unique format listed below. For example:

```
"video_url": {
    "mp4": "http://xxxxxx.com/Asset/40/ah05/ah05_en.mp4",
    "webm": "http://xxxxxx.com/Asset/40/ah05/ah05_en.webm",
    "flv": "http:// xxxxxx.com/Asset/40/ah05/ah05_en.flv"
}
```

The format of the device is added to the url to request the video. In some embodiments, a key can tell the application whether the particular campaign can be posted to a particular social media site. For example, the key "you_tube" can identify whether the campaign could be posted to YouTube. The application then either displays a link to the social media site or not, depending on the social media key.

Steps

Each step contains a dictionary of parameters (params). Each step contains an id, number (which is the order in which they should appear), img_url of the step, and the copy field which contains the instructions for each step.

Parameters

Each parameter contains fields, min_length, max_length which are validation rules to be used by the client application to do front-end form validation prior to posting the request back to the API. The field, order_num, signifies the display order of each input. 'input_title' is the name of the form field the API is expecting back and should be used to name and identify the input field. 'type' is a descriptor which tells the front-end what input type to use to gather data. In some embodiments, 'type'='text_input' is the only parameter type available. In some embodiments, the type can be "file" and "integer". File is meant to be a file upload element and integer means that only integer numbers are valid input. During the submission process the integer field is validated to determine that it only contains an integer and the application responds with a message which states so.

FIG. 1B is a block diagram of the system for generating 3D user personalized media templates according to another embodiment of the present disclosure. FIG. 1B depicts another grouping of the software modules disclosed in FIG. 1A. The interface to the infrastructure is shown alternatively as mobile device 100 or as web browser interface 101, which is not necessarily on a mobile device. Web browser interface 101 can be designed to have different looks as long as it can capture user data to be passed to the web server to start the personalized video clip creation process.

In this example, web server 110 includes both app server 102 and account server 104, and metadata 114 and asset server 116 are combined into one asset server module 114+116, and the web server 110 also include API Server 118 and Submissions 112. Web server 110 also can include encoders 140 and in some embodiments, one or more virtual databases 172a, 172b. Databases 120 can include physical databases 122-127 and, in some embodiments, virtual databases 172a. The servers may be behind firewall 176. Mobile device 100 communicates with web server 110 and encoders 140 through one or more load balancers 178. Web server 110 and encoders 140 are in communication with databases 120, renders 130 and storage 160. Each profanity server 126, 127 includes either profanity SVR main 126a or SVR slave 127a, which contains the profanity filter code used to filter for profanity. Mgt main 126b or Mgt slave 127b provides the profanity filter's web based management interface, which manages the profanity rules. Pgboucer 174 provides a pool of persistent connections to the database, and is used to query against the database. Web server test 175 and encoder test 173 provide temporary locations to perform testing of the production environment. They do not play a role in the day-to-day operation. Also, in FIG. 1B, TMP Directory 166 and Clip Files database 168 are combined in one module 166+168, in addition to a separate Clip Files database 168.

Figure 2B:
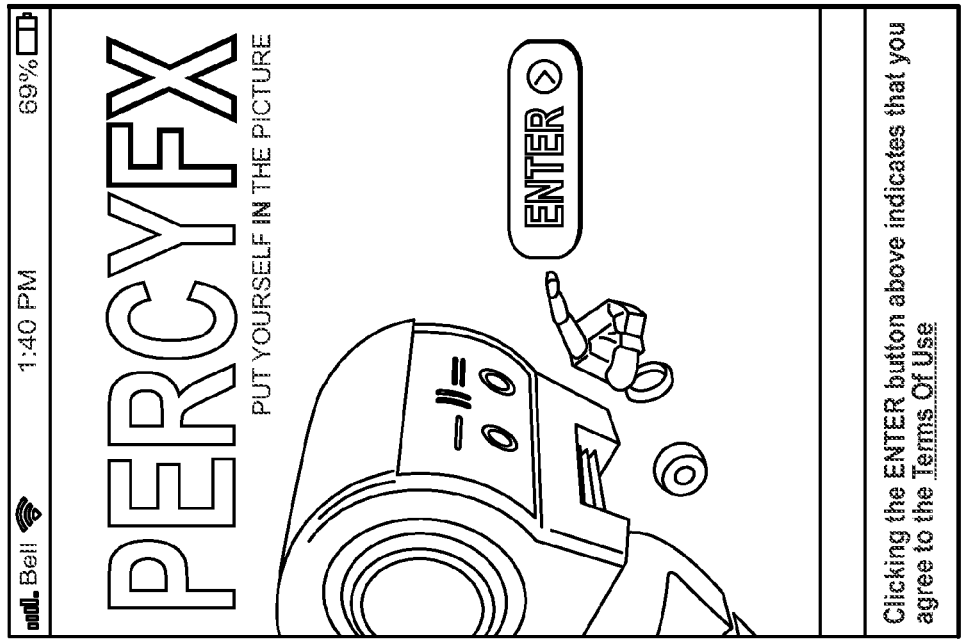
FIGS. 2A-2P are screenshots of menu options available on a mobile device according to embodiments of the present disclosure.
Figure 2A:
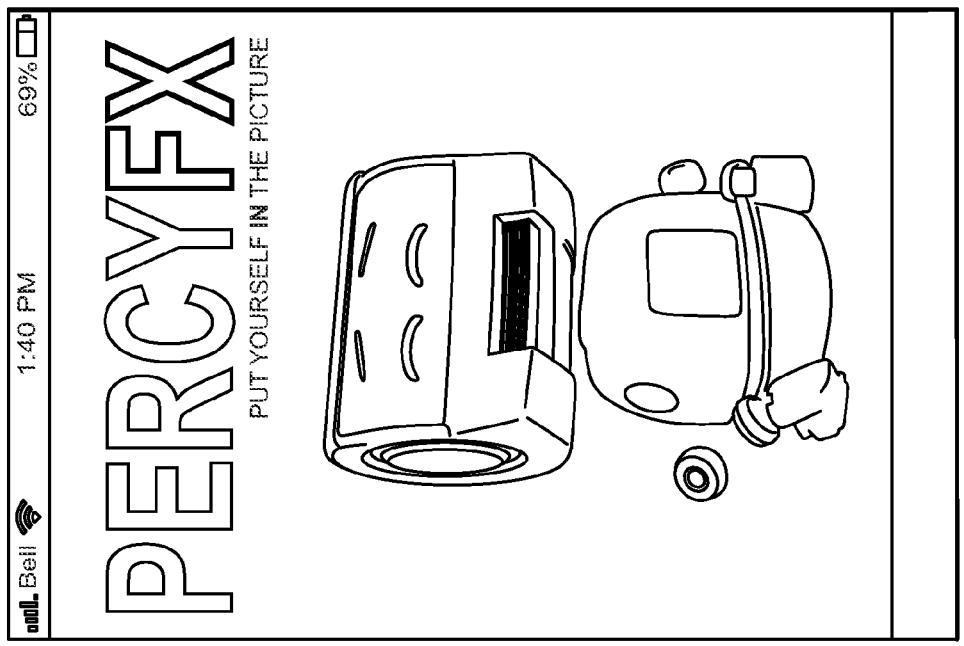
Figure 2C:
Figure 2D:
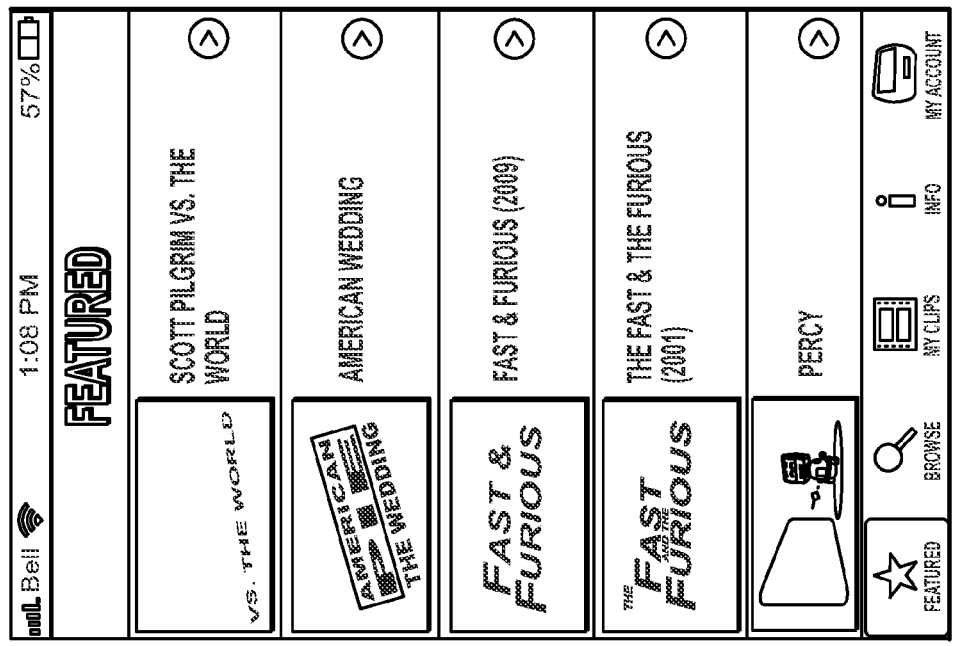
Figure 2F:
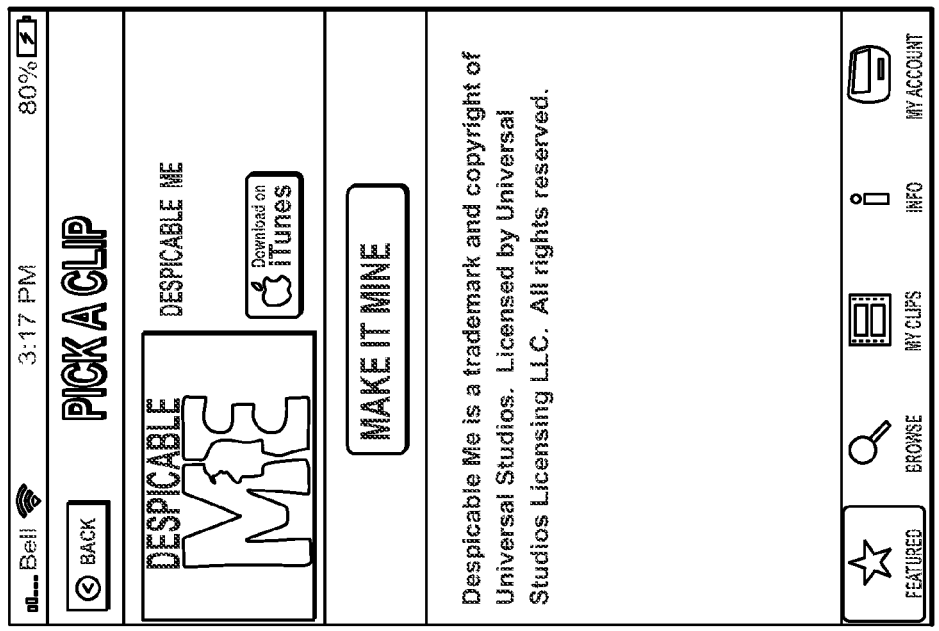
Figure 2E:
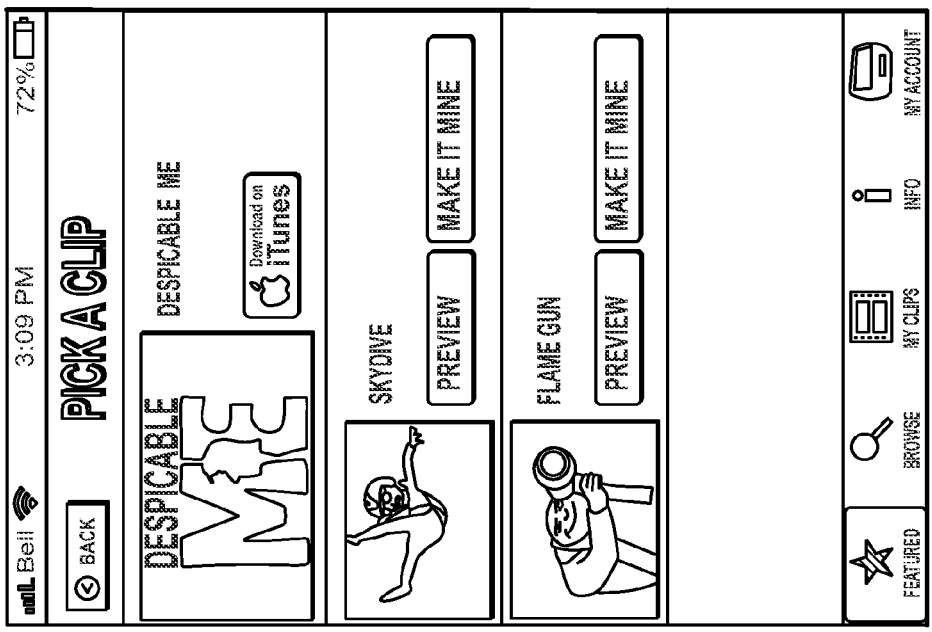
Figure 2H:
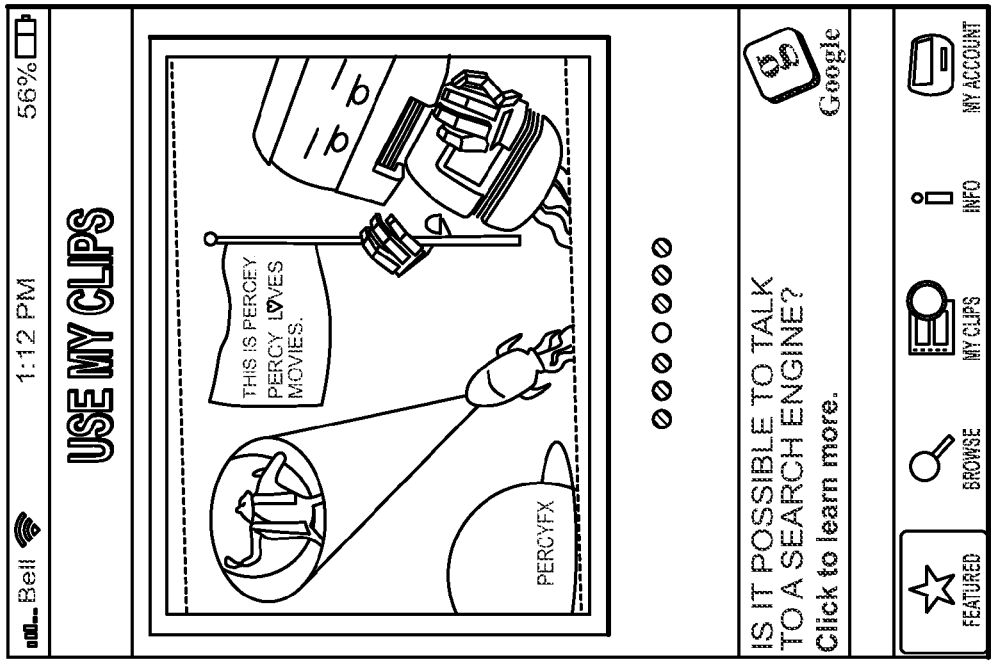
Figure 2G:
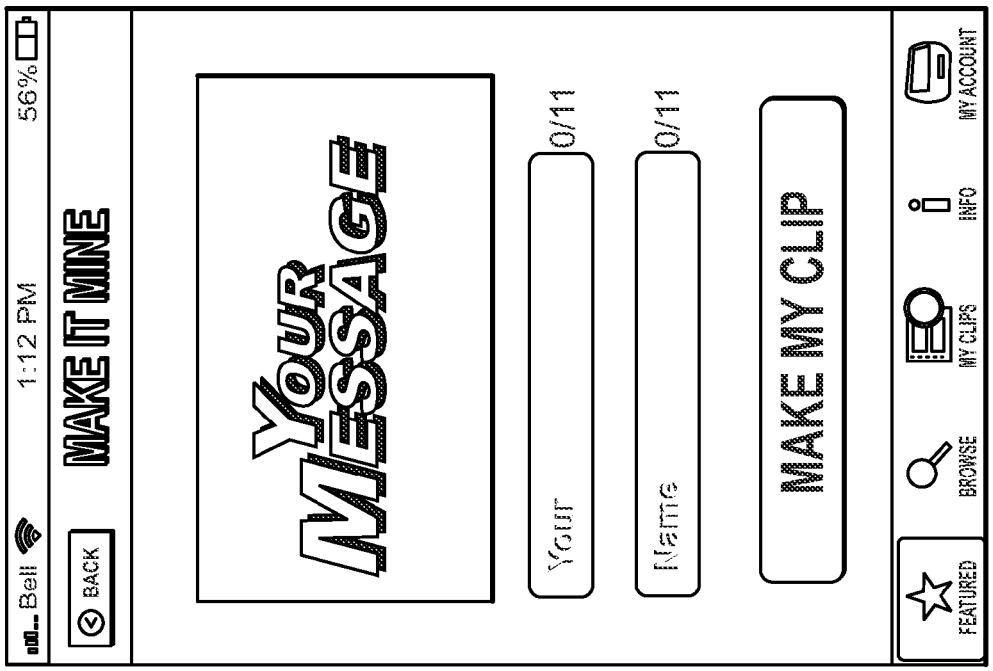
Figure 2L:
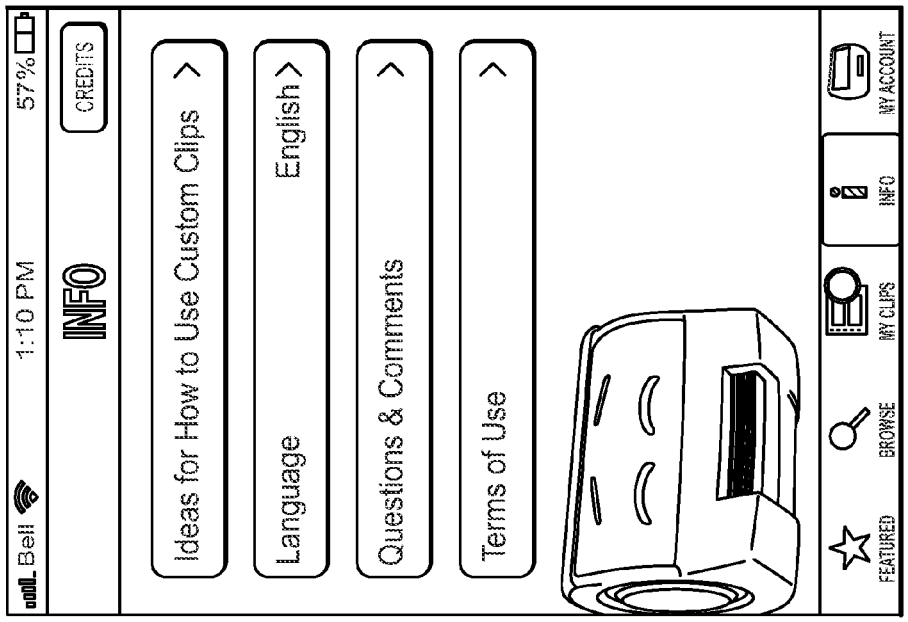
Figure 2K:
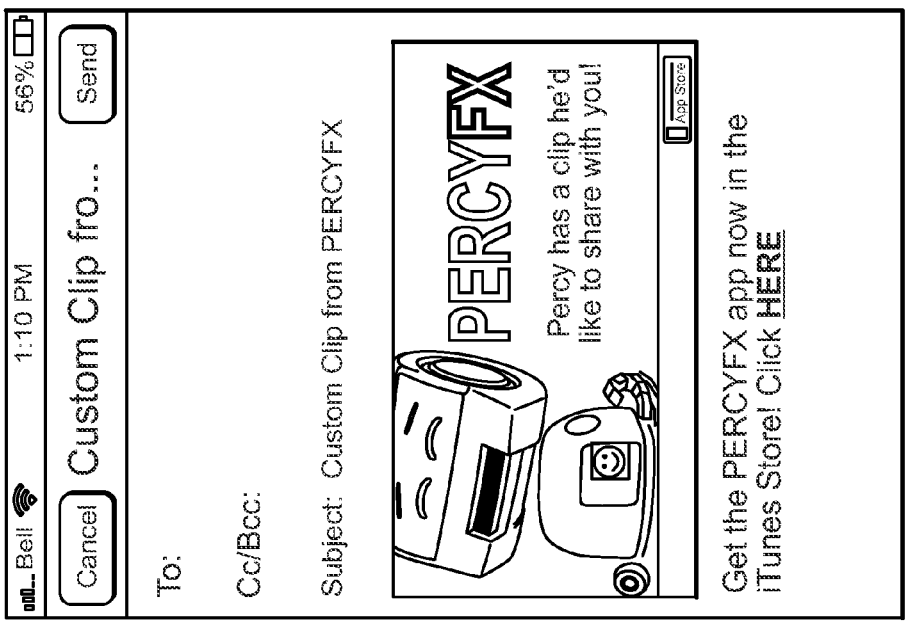
Figure 2N:
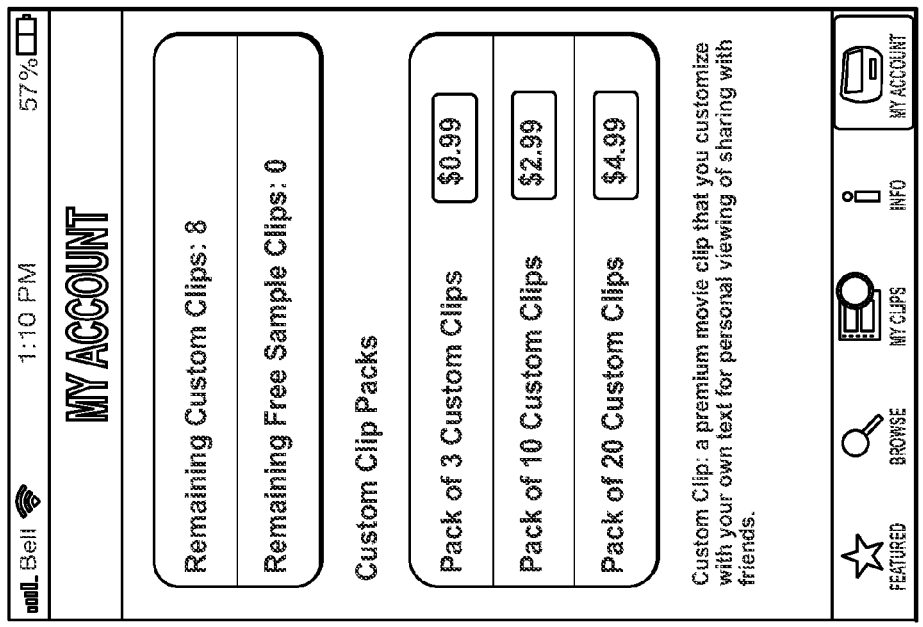
Figure 2M:
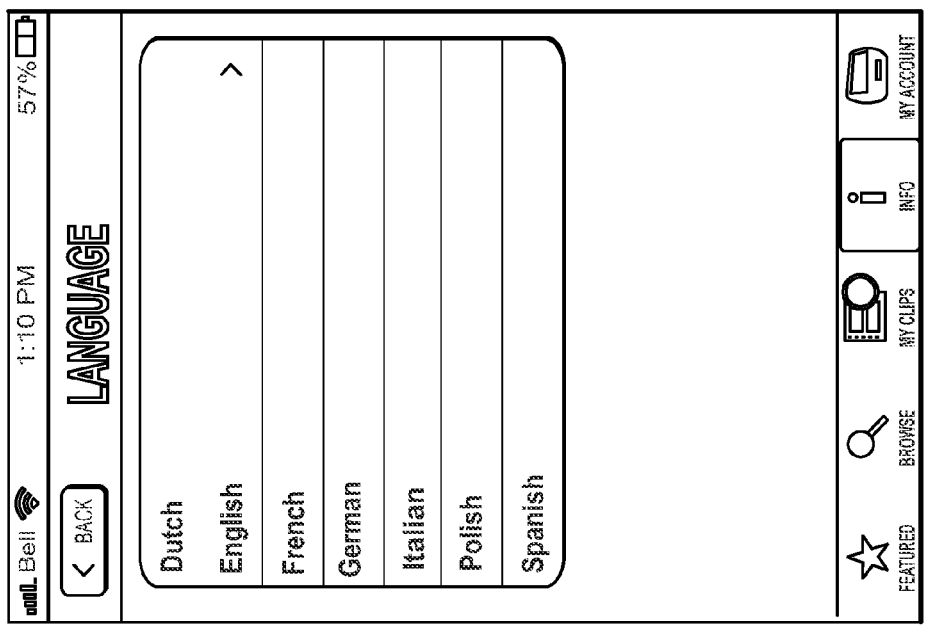
Figure 2P:
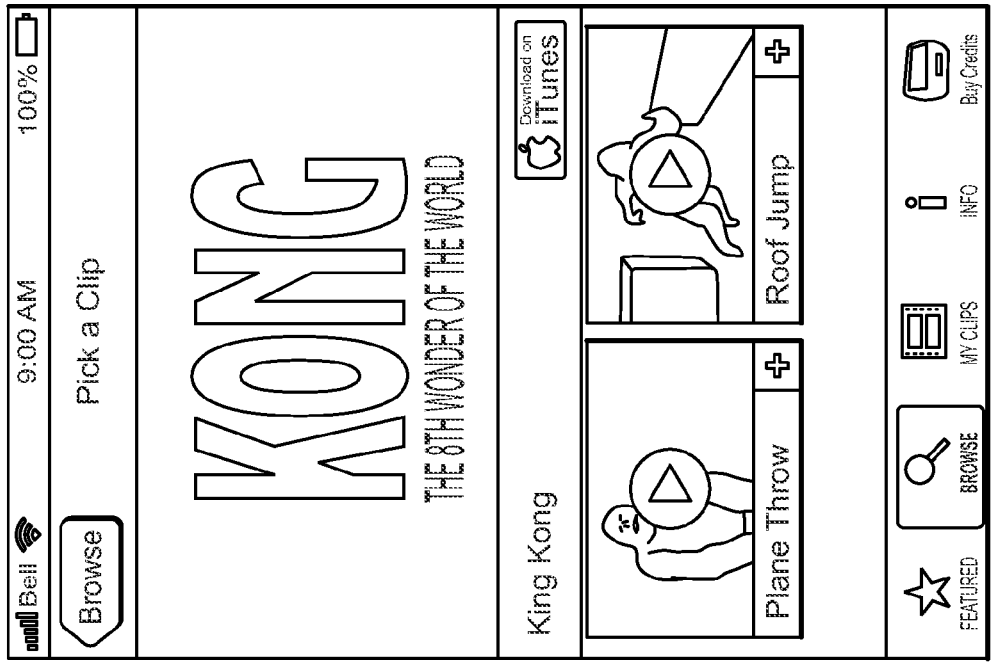
Figure 2O:
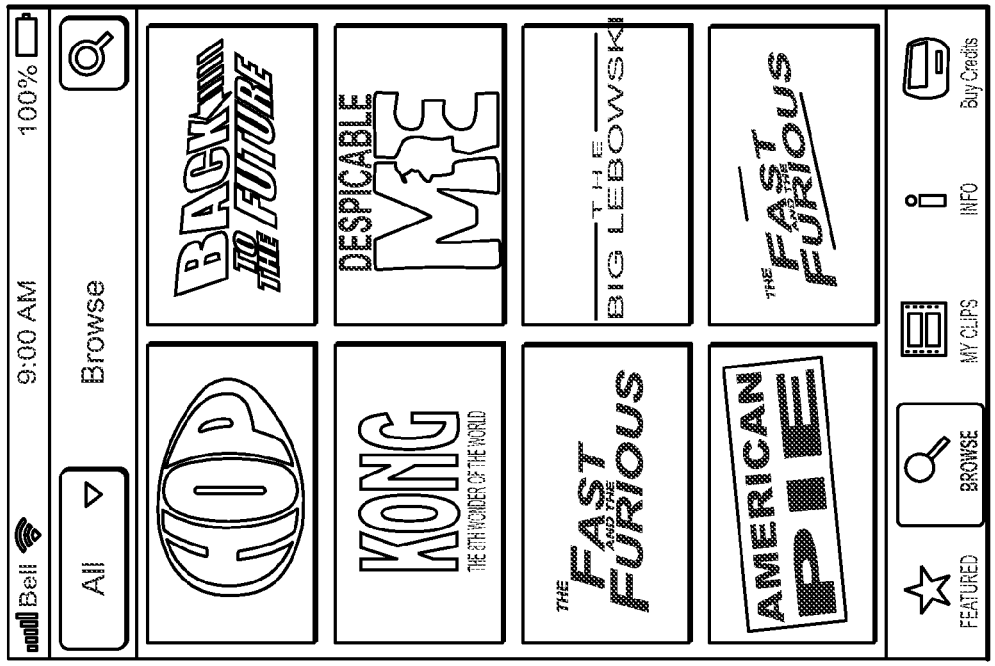

FIGS. 2A-2P are screenshots of menu options available on the mobile device 100, according to embodiments of the present disclosure. FIG. 2A depicts the mobile device 100 screen upon opening the application. FIG. 2B depicts a screen for the user to enter the application for the first time and shows the terms and conditions of the agreement. The user can either select 'terms and conditions' or press the enter button. FIG. 2C depicts featured video clips available for purchase though the application. FIG. 2D depicts movie categories in the catalog provided to the user. For example, featured, action, animation, comedy, family, fantasy, romance, and thriller. FIG. 2O depicts an alternative browse screen. FIGS. 2E and 2P depict alternative screens where a user can select a clip. FIG. 2F depicts the user selection of the "DESPICABLE ME®,"

clip. By pressing "make it mine" the user is moved to the screen shown in FIG. 2G. In this screen, the user can enter text that will be displayed in the modifiable text, shown in the screen shot as "Your Message". FIG. 2H shows a screen shot of the "use my clips" screen, this is an interstitial image that is displayed to the user while the user is waiting for the video to be downloaded and displayed. FIG. 2I shows a screen shot of the "My Clips" portion of the application. In the "My Clips" section, all of the clips generated by the user and stored by the user on the mobile device 100 are shown. For example, this screen shot depicts three generated clips "Finchmeister," "Skydive," and "Sex Bob-Bomb," The last clip is a pending clip. The "pending" designation means that the user has requested the clip to be personalized, but the system has not yet finalized the personalized video clip for download. FIG. 2J depicts a screen shot of the user selecting the "Finchmeister" clip for playing. If the user presses the "play" button, the mobile device 100 will play the video. If the user presses the "delete" button, the mobile device 100 will delete the video from the mobile device's memory. FIG. 2K depicts a screen shot of the user preparing to send a clip to a friend via email. In addition to sharing via email, users can share via FACEBOOK® and YOUTUBE®. FIG. 2L depicts a screen shot of an application information page. FIG. 2M depicts a language selection screen displaying the available languages for the application. FIG. 2N depicts an account information screen. The account information details information on the user's account.

Figure 3A:
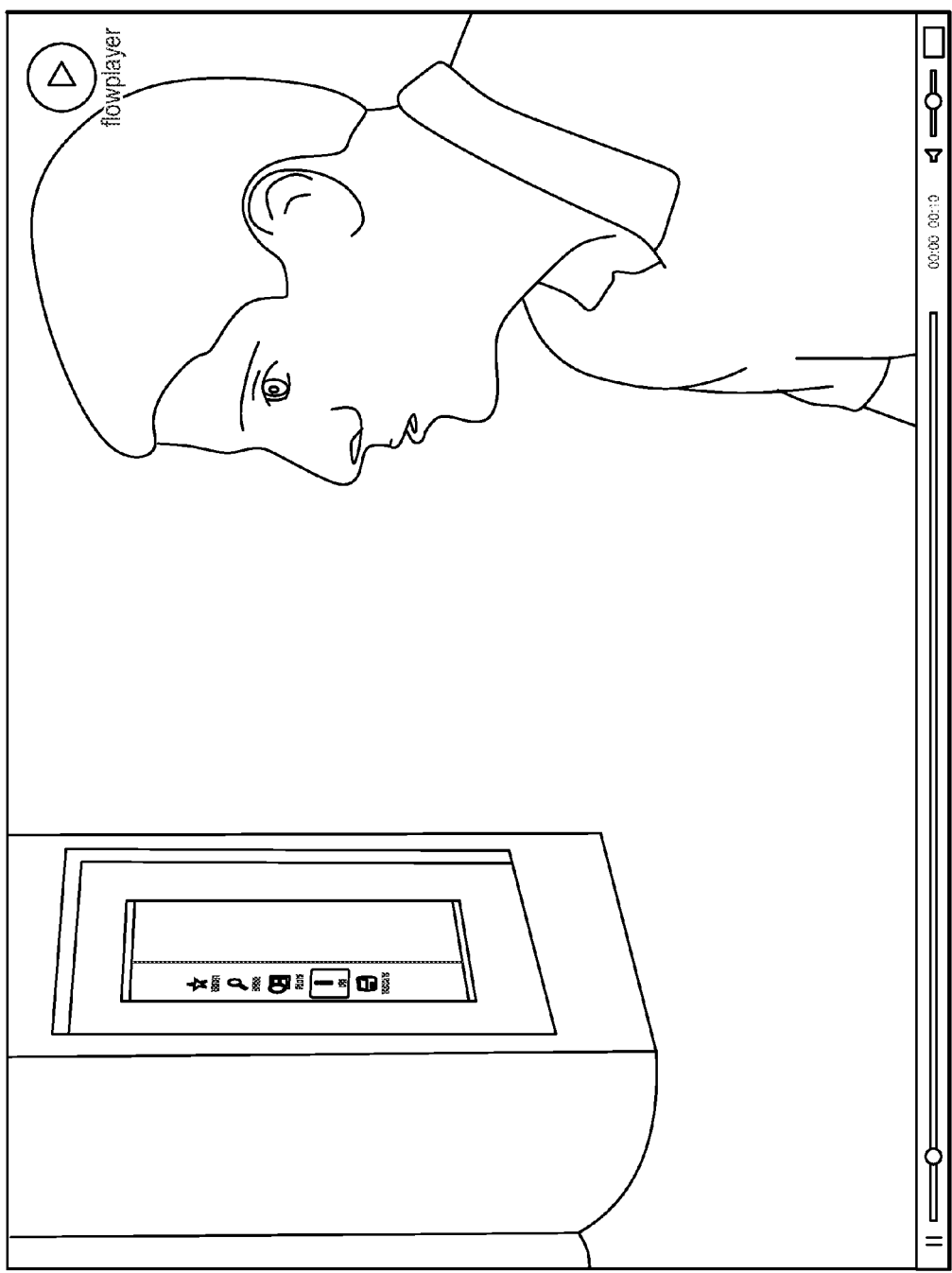
Figure 3C:
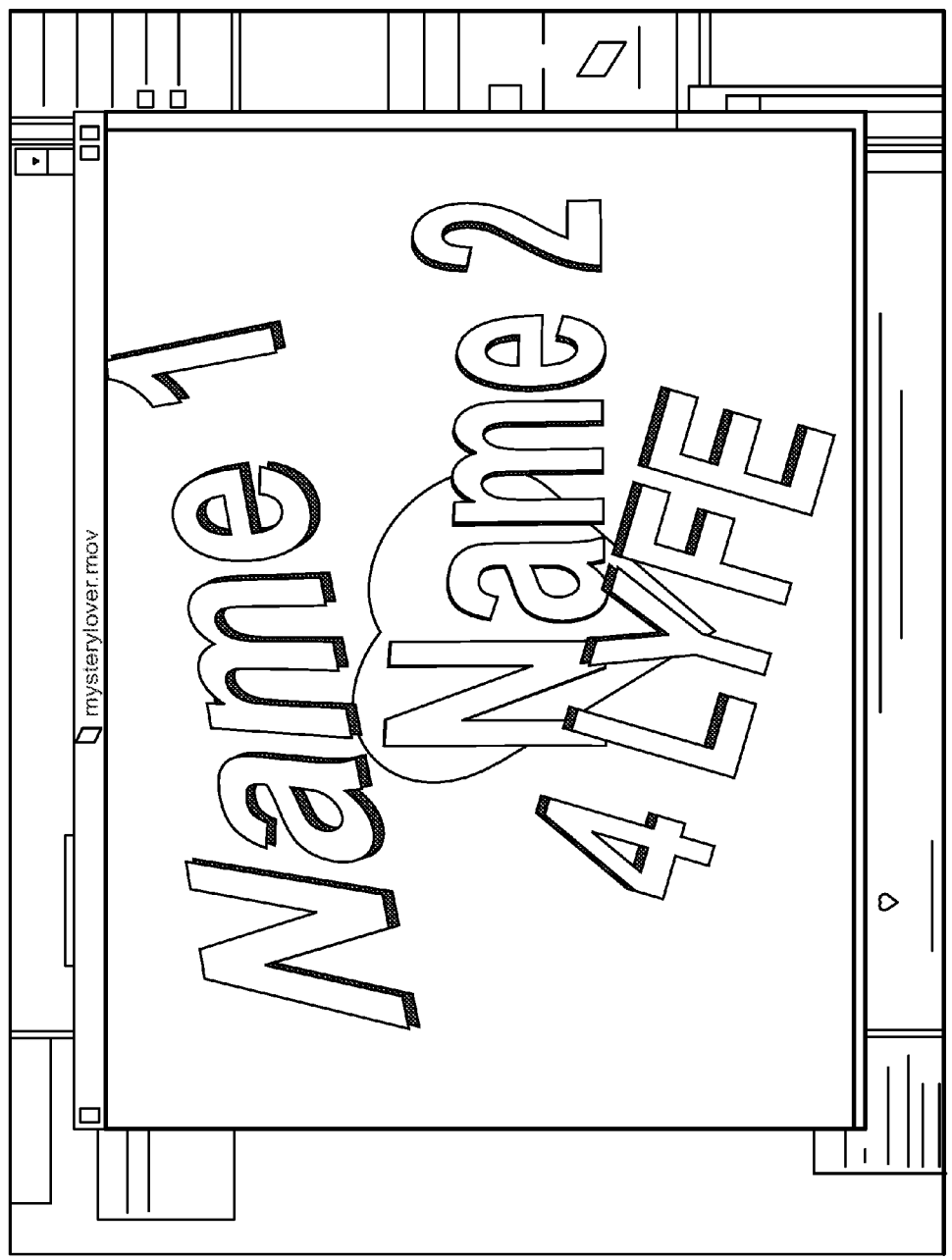

FIGS. 3A-3C are screenshots of personalized media files according to embodiments of the present disclosure. FIGS. 3A and 3B show a scene from a movie. FIG. 3C shows the personalized 3D text that is added into the movie clip (Name 1, Name 2).

Figure 4A:
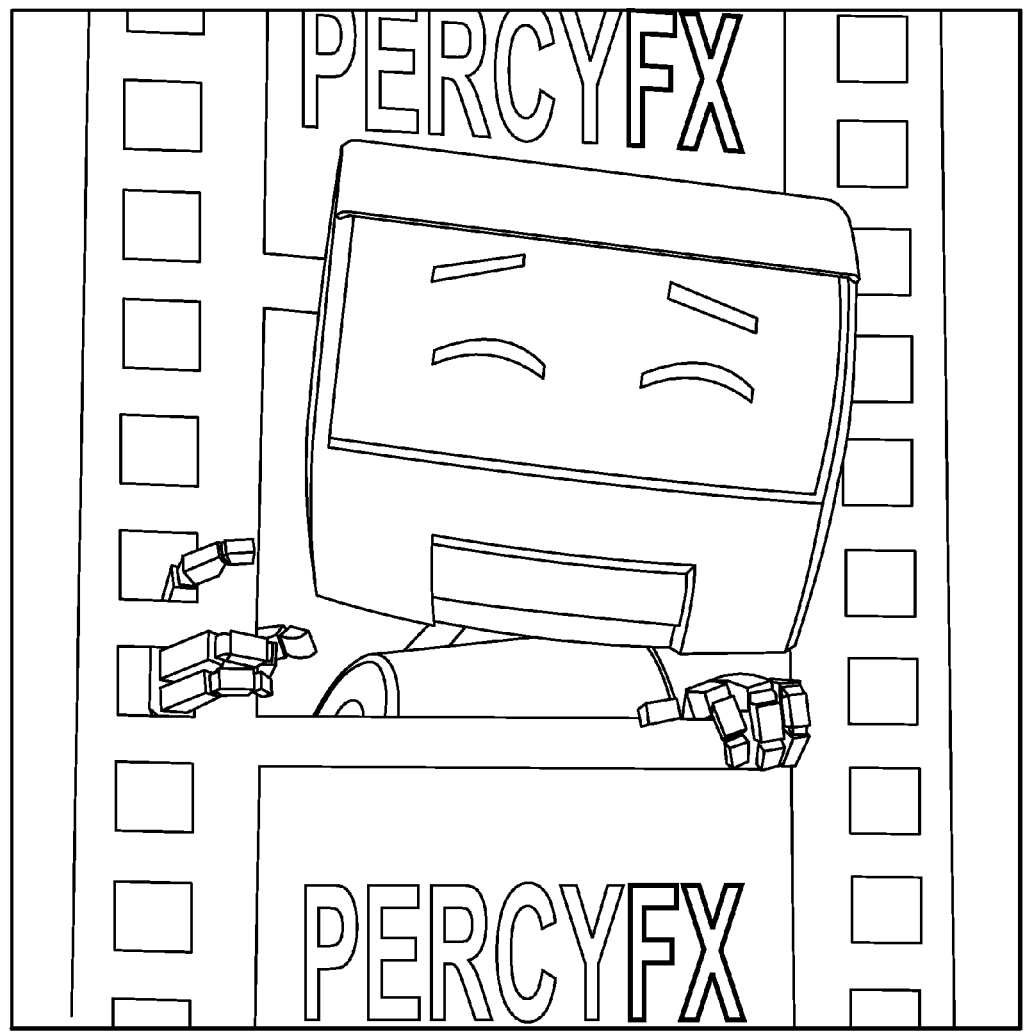
FIGS. 4A-4U are screenshots of additional menu options available on a mobile device, according to embodiments of the present disclosure.
Figure 4B:
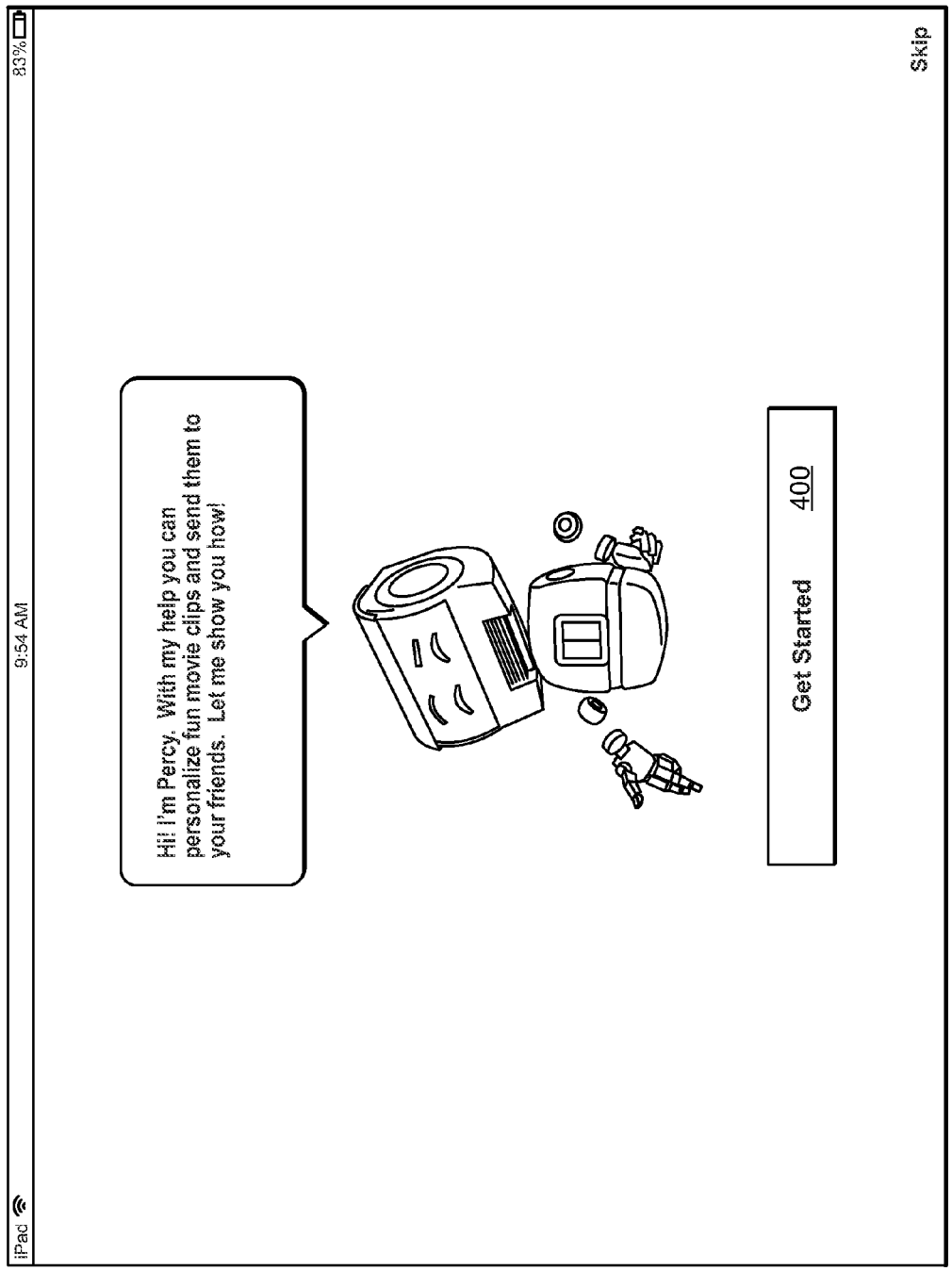
Figure 4D:
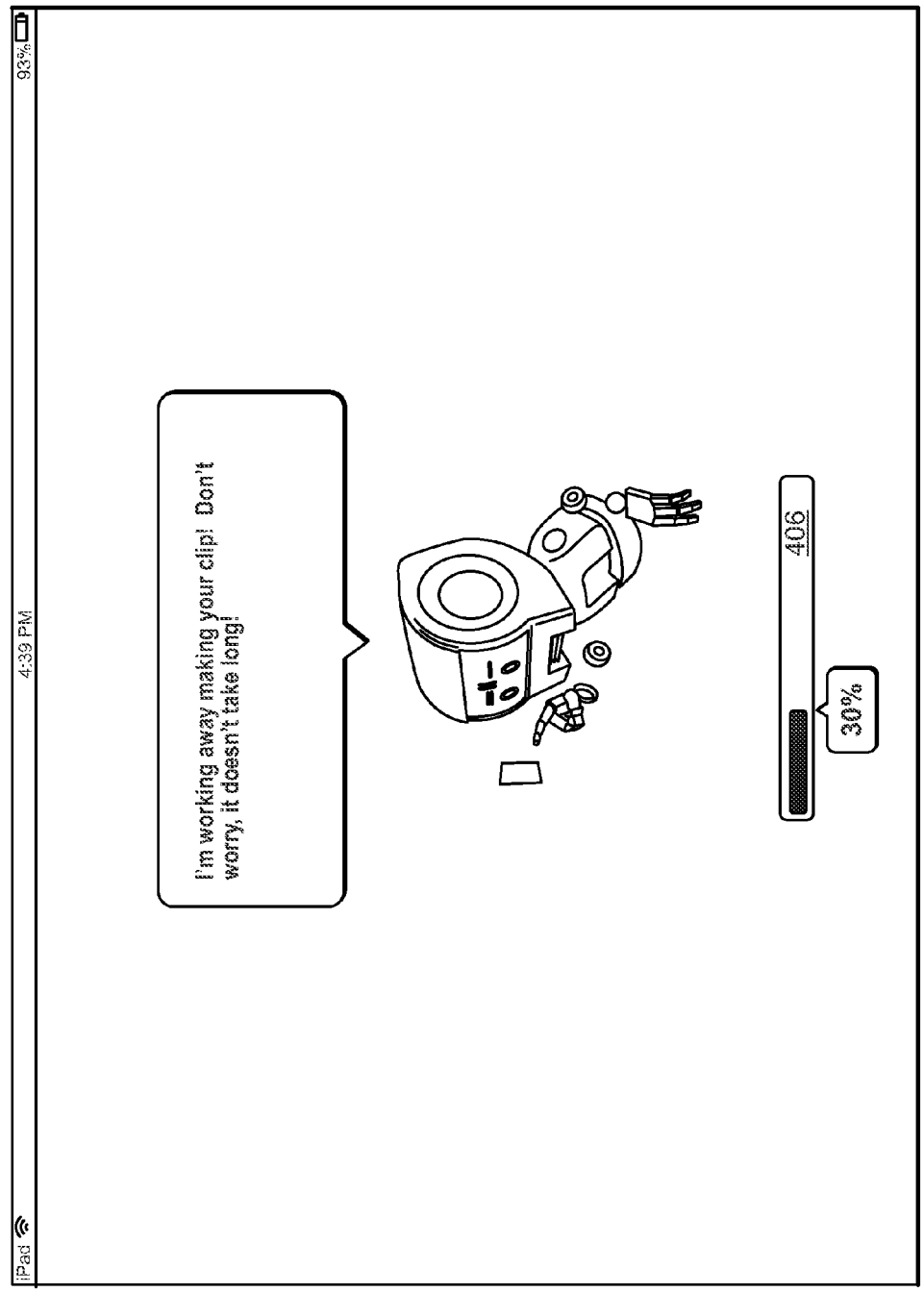
Figure 4E:
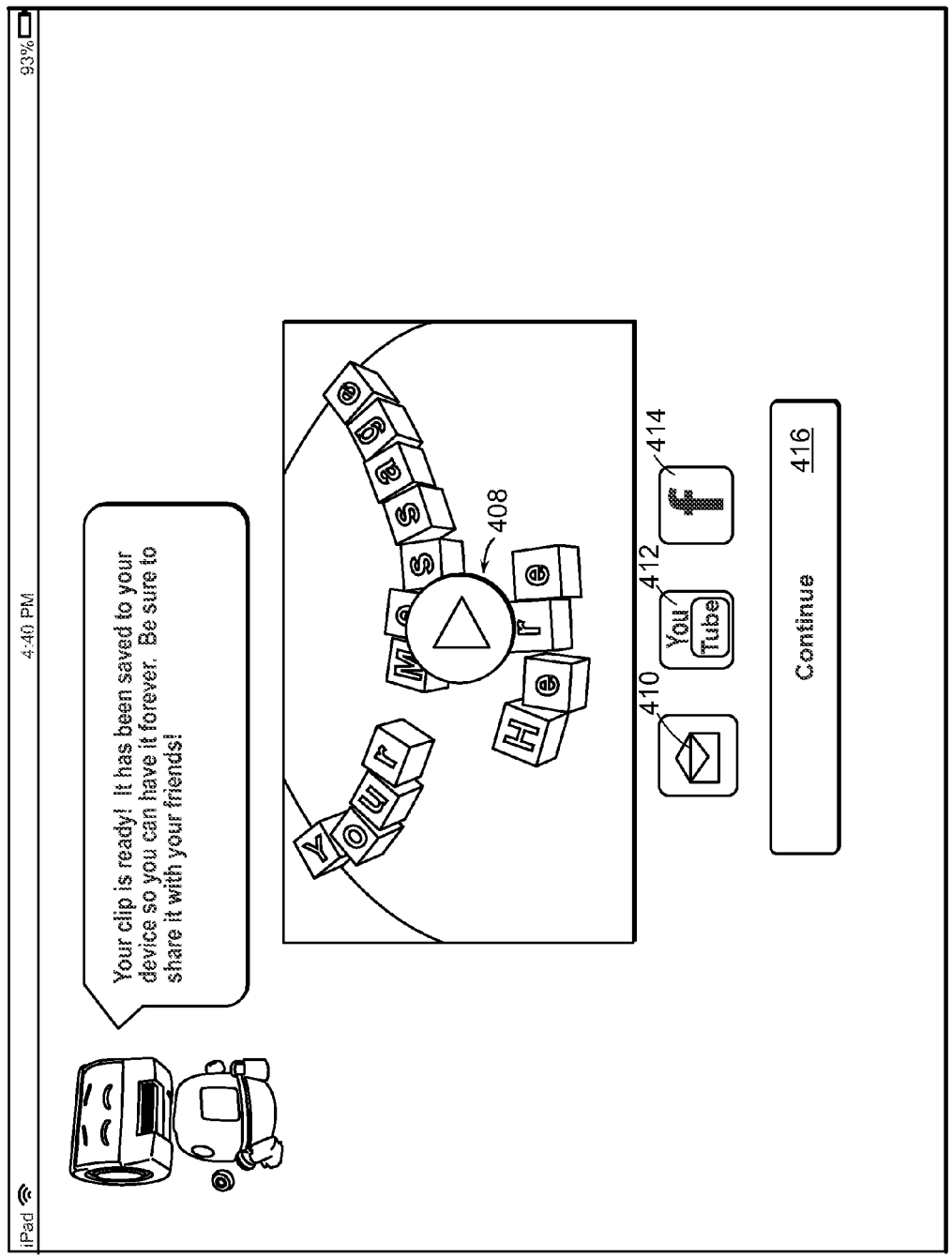
Figure 4F:
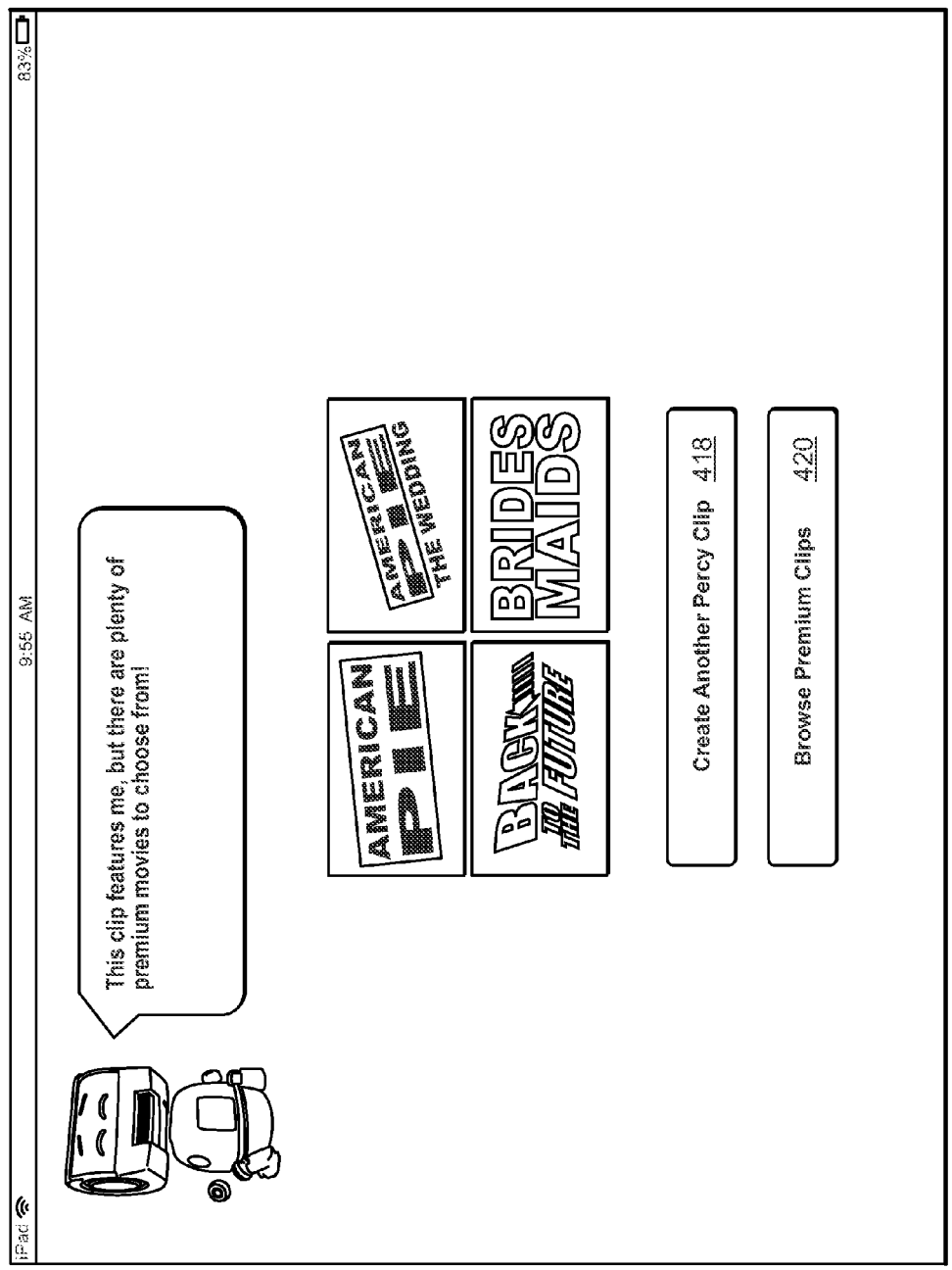

FIGS. 4A-4U are screenshots of additional menu options available on the mobile device 100, according to embodiments of the present disclosure. In this embodiment, an iPad® (Apple, Cupertino, Calif.) is used to access the software application. However, other types of mobile devices, tablets, phones, or computers can be used to access the application. FIG. 4A depicts an opening screen as viewed on the device. FIG. 4T depicts an alternative opening screen. FIG. 4B depicts a start page as viewed on the device for first time users. A user can select "Get Started" 400 to launch the application. FIG. 4C is a page where a user can enter a message in the "Your Message Here" space 402. Once the user enters the message, the user can select "Create a Clip!" 404. FIG. 4D depicts a status screen, which shows the user the status of the clip 406, e.g., it is 30% complete, using a status bar to track the progress. Once the status bar reaches 100% the clip will have been downloaded to the user's device. FIG. 4E depicts a screen showing the final version of the video clip. The user can select the clip to play the clip 408, can (in some embodiments) store the clip on the mobile device, and/or can share the clip with friends, for example, through mail 410, YouTube® 412, or Facebook® 414. The user can select "Continue" 416 to advance to the next screen. FIG. 4F depicts a screen that allows a user to select an "Create Another Percy Clip" 418 or to "Browse Premium Clips" 420. Upon the next time the user accesses the app the user will see the opening splash screen 400 and then will see FIG. 4G. FIG. 4B to FIG. 4F in some embodiments are only for first time users.

Figure 4G:
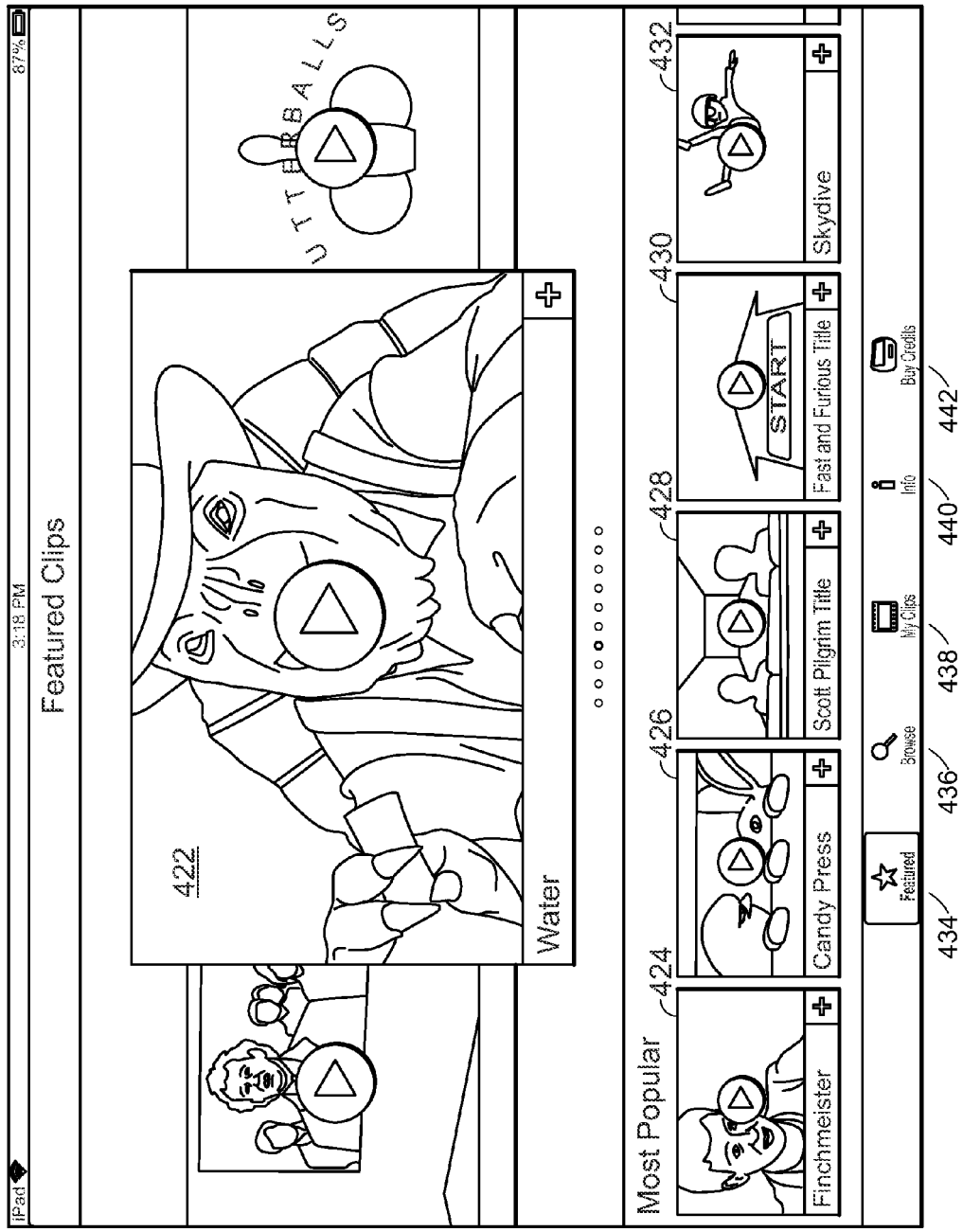
Figure 4H:
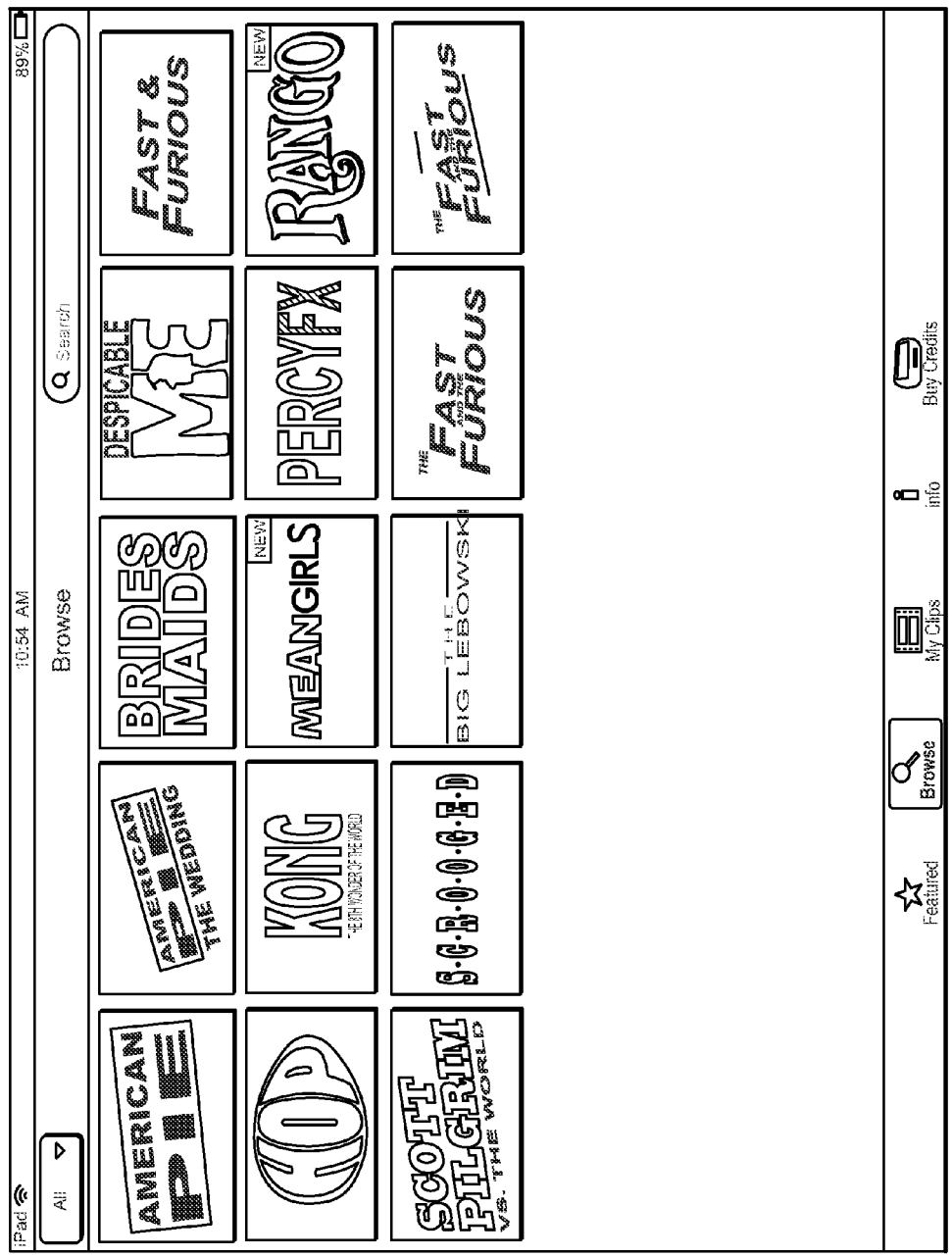
Figure 41:
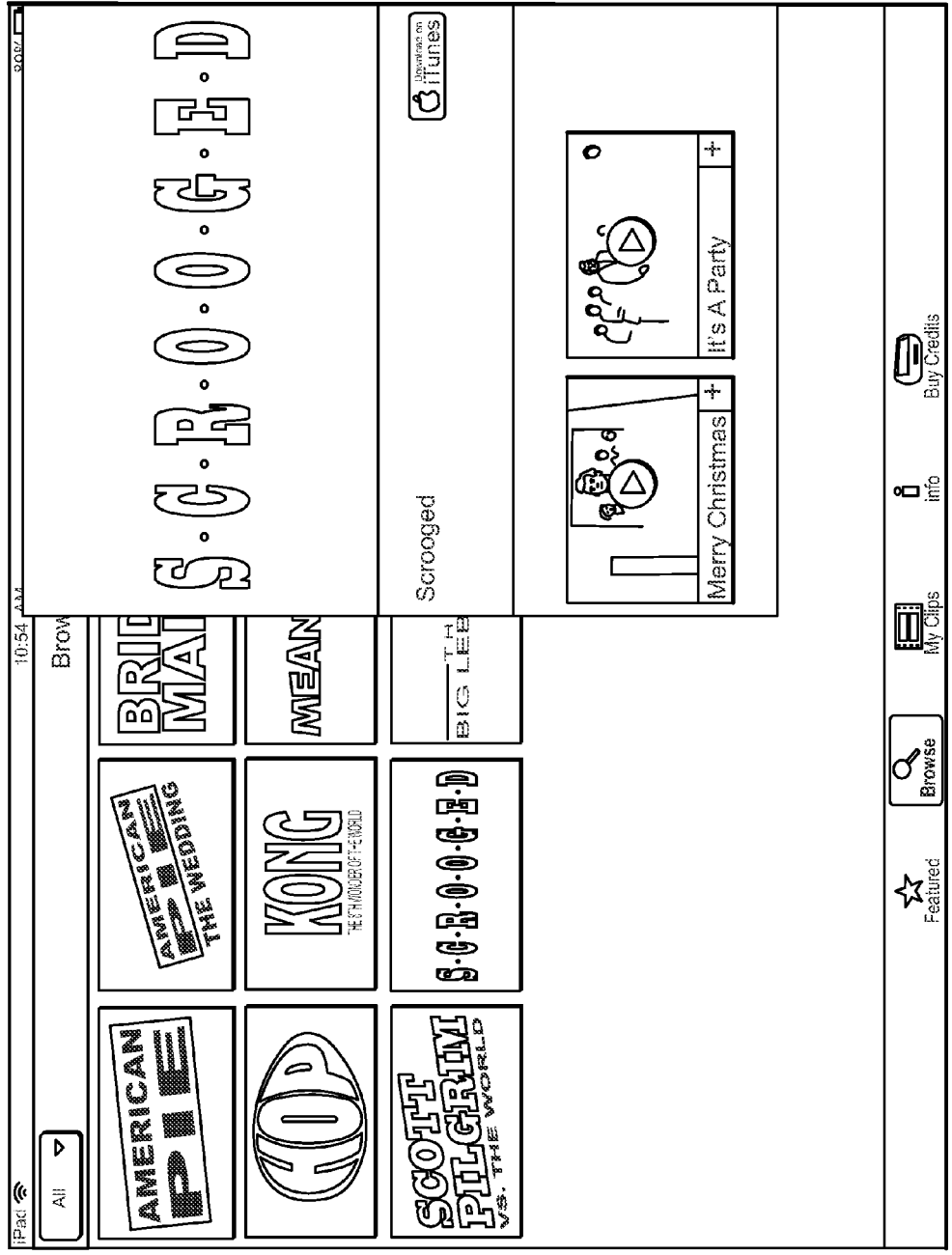

FIG. 4G depicts a featured clips screen. The featured clips screen allows a user to select from a plurality of featured clips from famous movies or television shows. For example, as shown here, a user can select from clips such as "Water" 422, "Finchmeister" 424, "Candy Press" 426, "Scott Pilgrim Title" 428, "Fast and Furious Title" 430, "Skydive" 432 and can scroll through other clips. On the bottom of the screen a user can select "Featured" 434 to view featured clips, "Browse" 436 to browse through clips, "My Clips" 438 to view the user's created clips, "Info" 440 to access information or help about the application, and "Buy Credits" 442 to purchase credits to create clips. FIG. 4H depicts the "Browse" 436 option, which allows a user to browse through a plurality of available movie clips. FIG. 4I depicts a selection of "Scrooged" from the list of clips in the browse screen. "Scrooged" clips include two possible clips "Merry Christmas" and "It's a Party". If the user selects one of the clips, the clip plays and the user can see where his/her personal information is inserted into the clip.

Figure 4J:
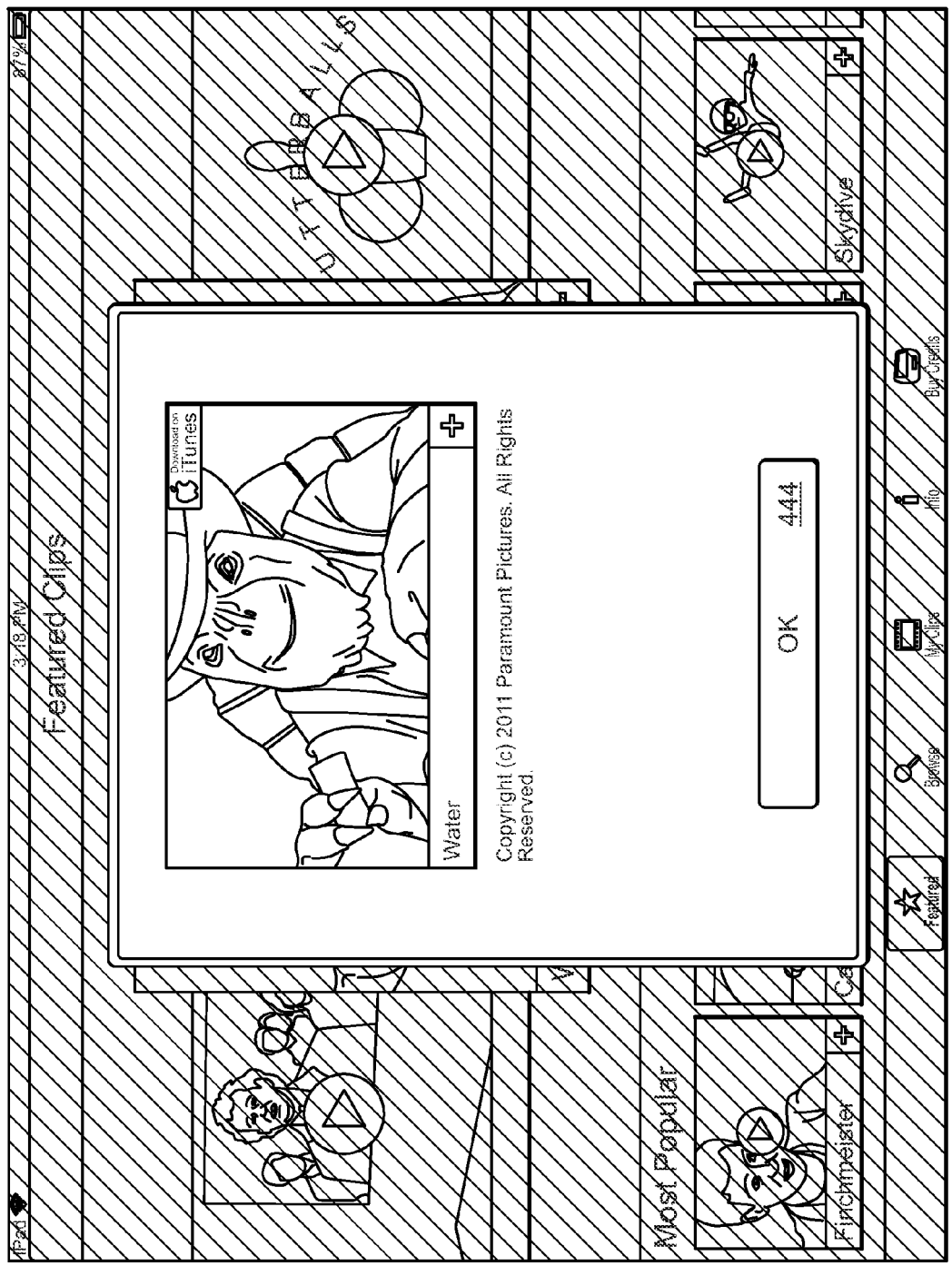
Figure 4K:
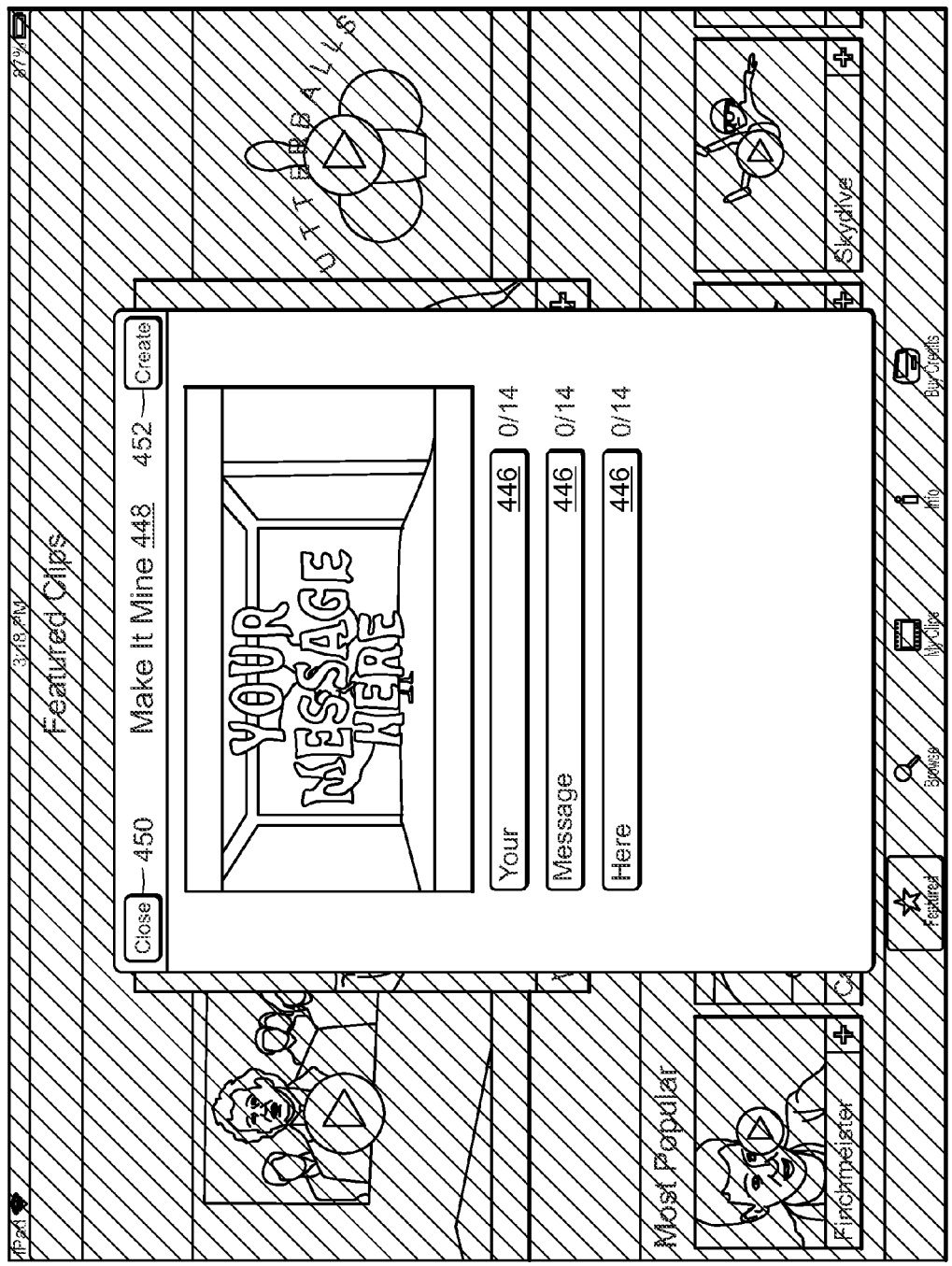
Figure 4L:
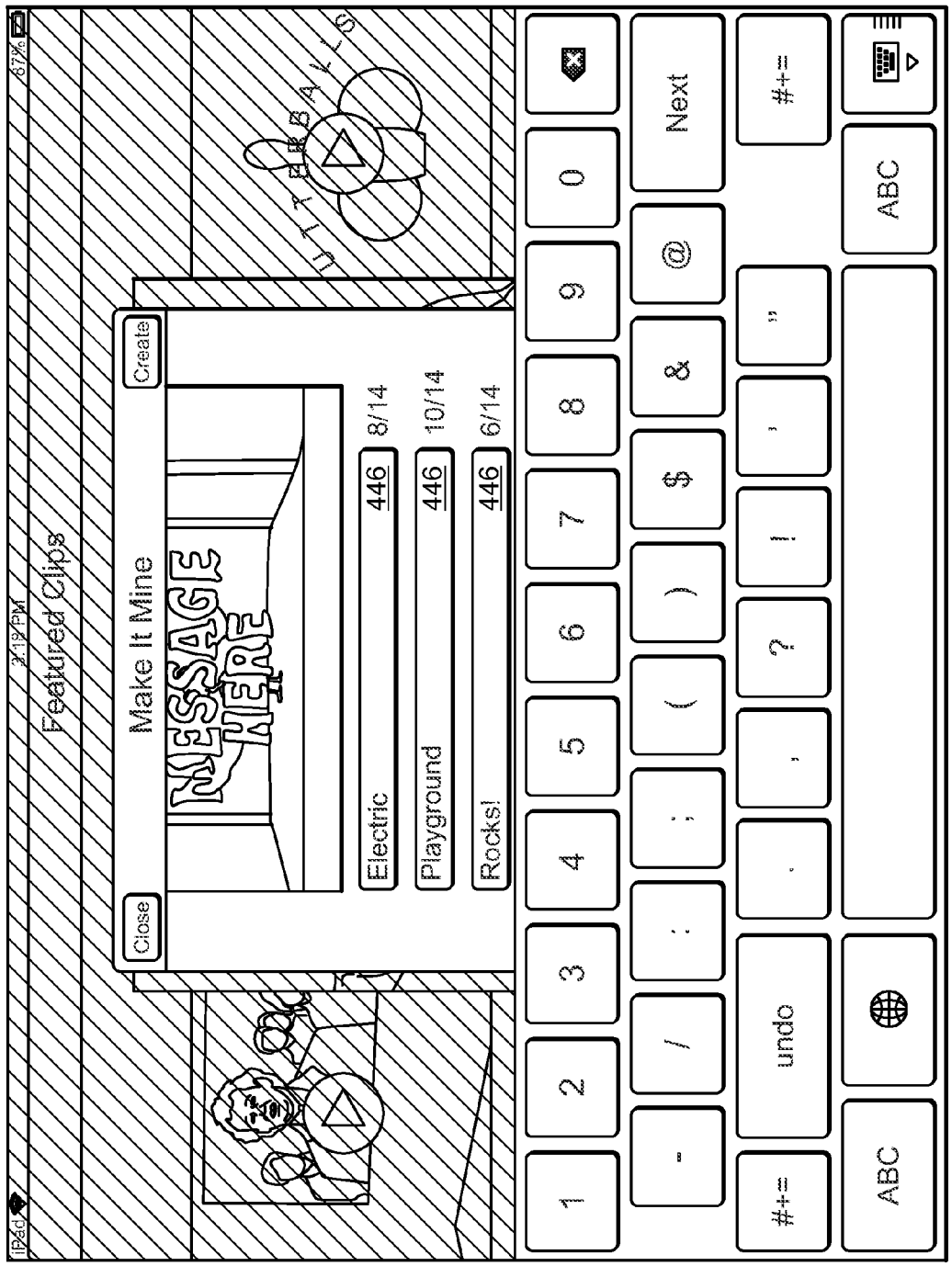
Figure 4M:
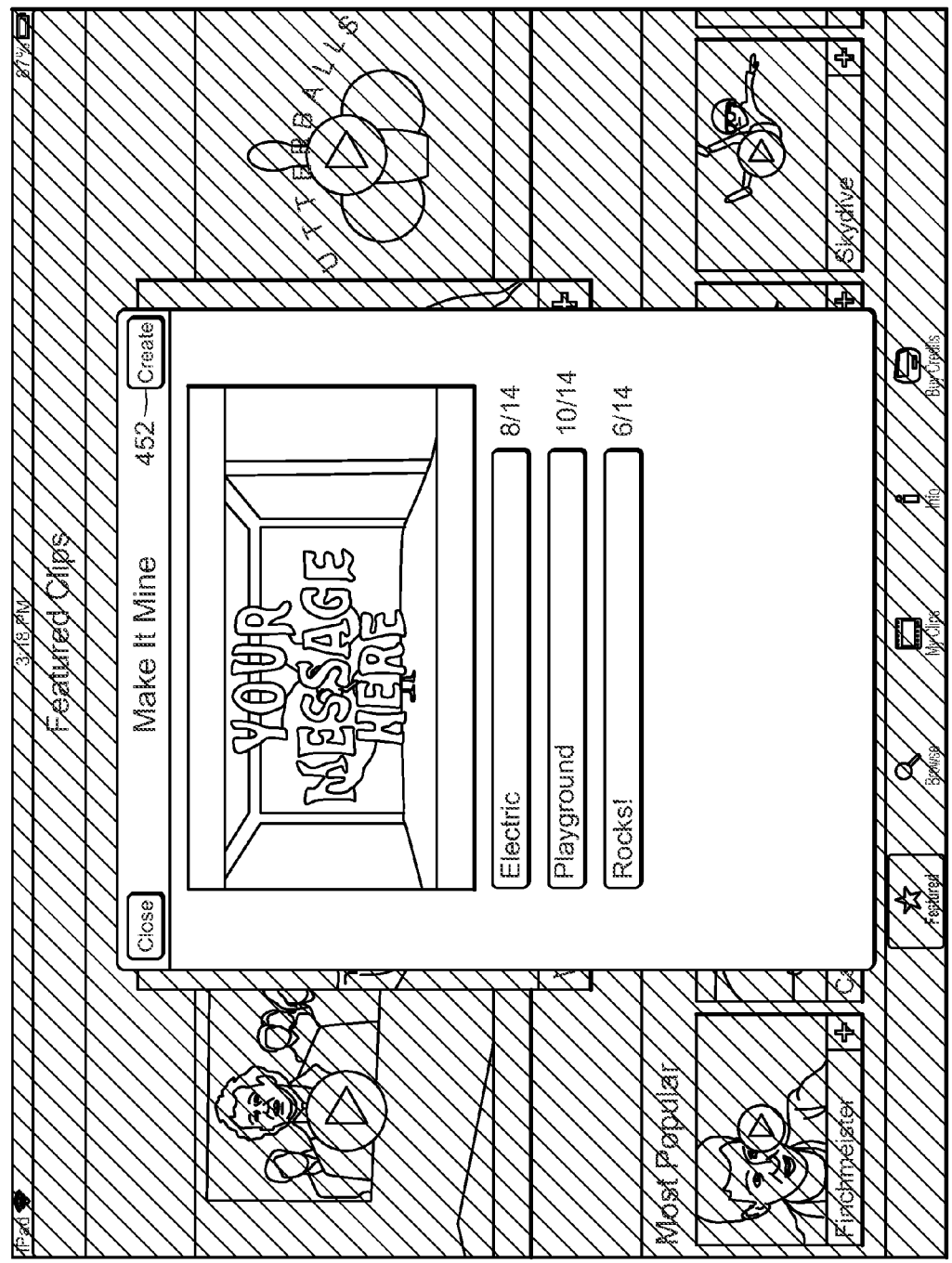
Figure 4N:
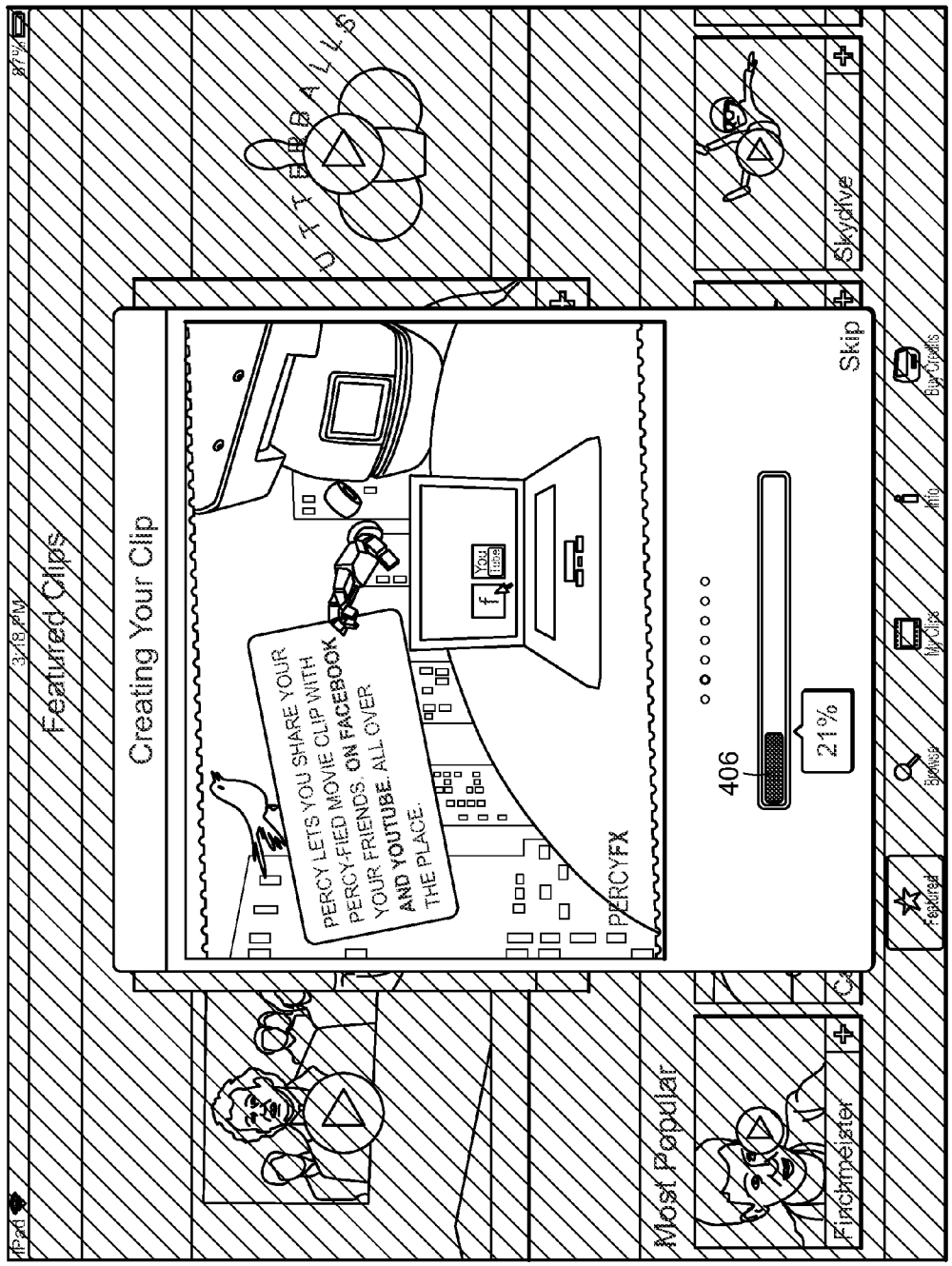
Figure 40:
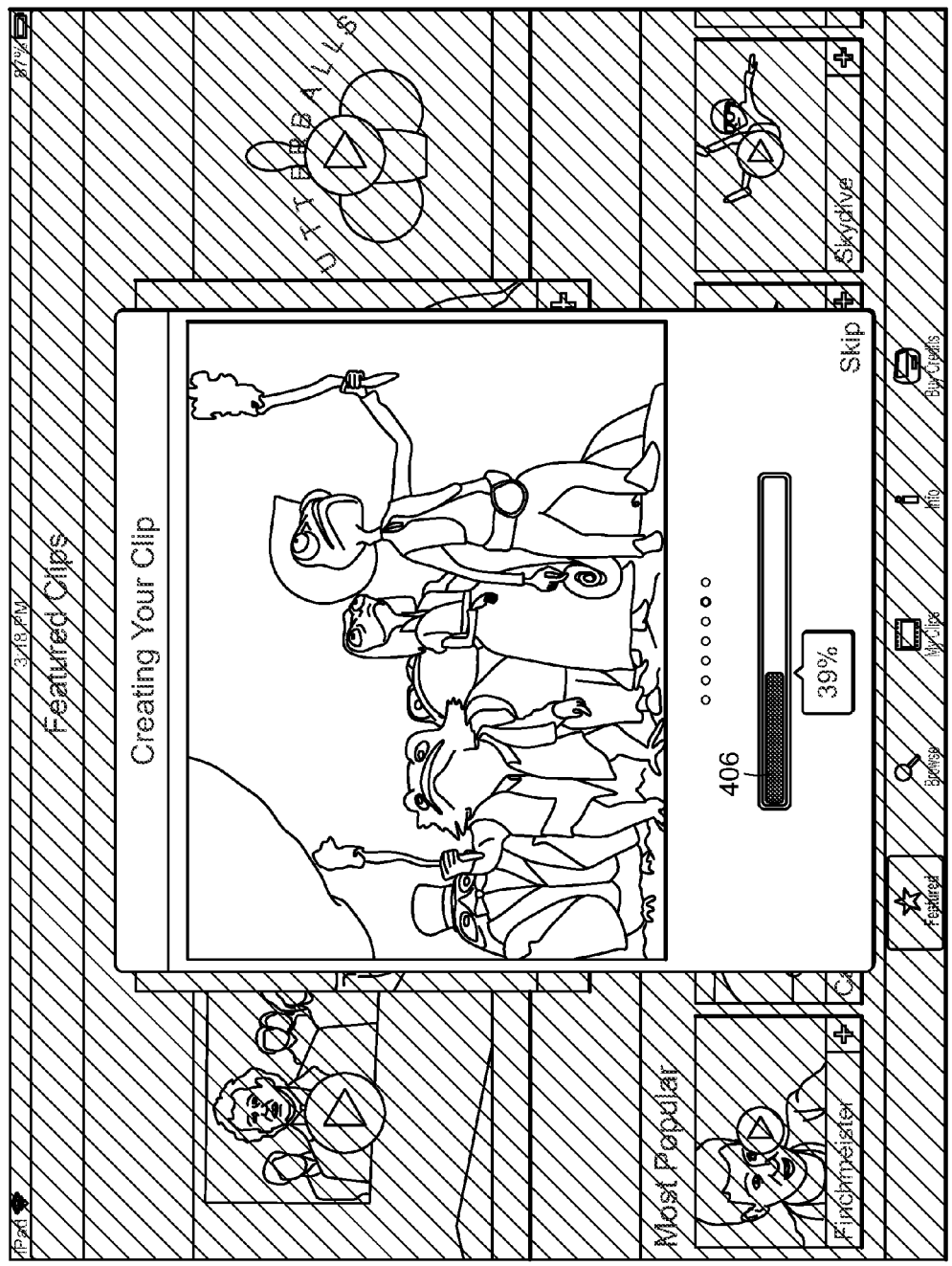
Figure 4P:
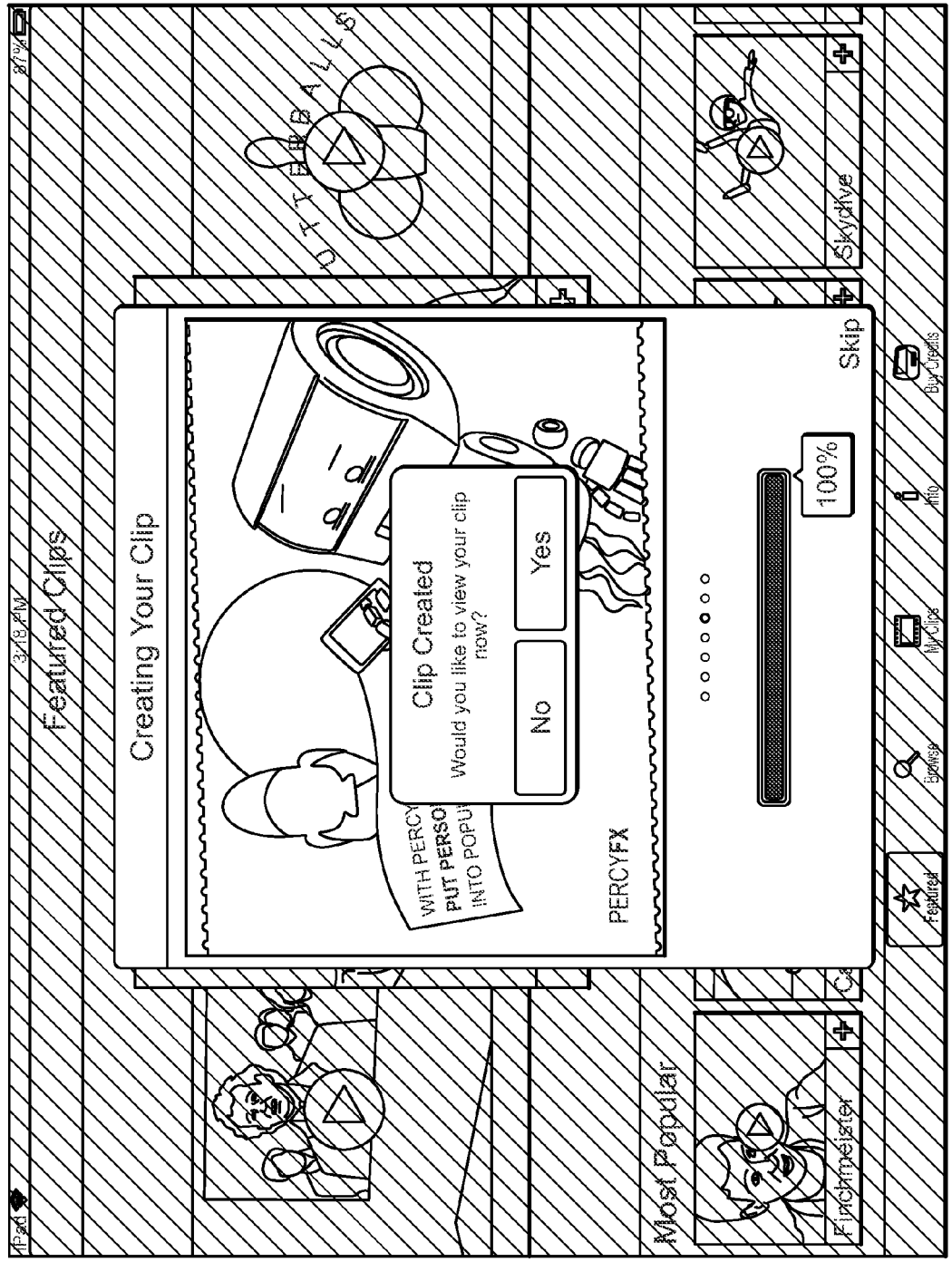
Figure 4Q:
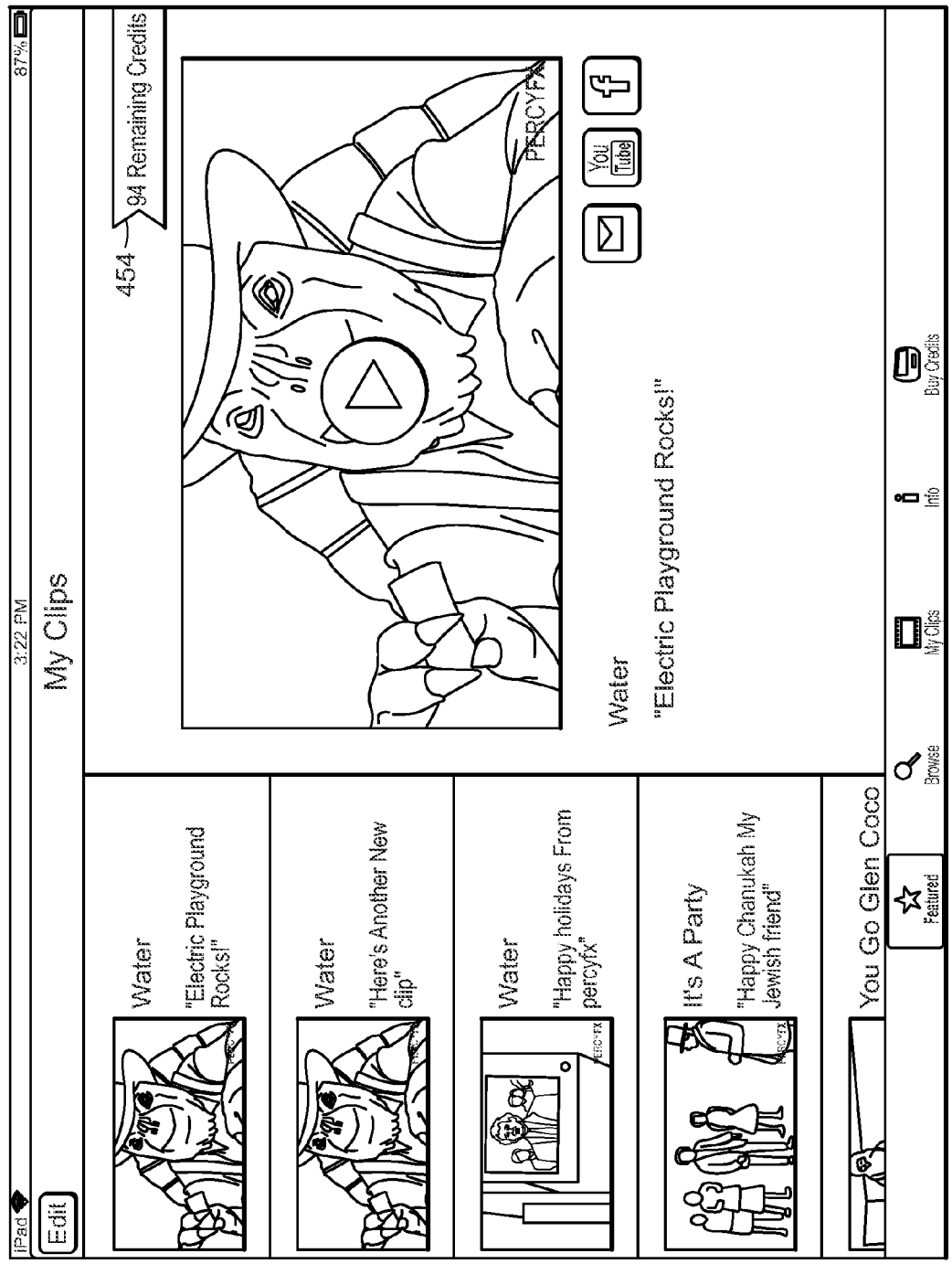

Returning to the "Featured Clips" 434 menu, FIG. 4J depicts the selection by a user of the Water 422 clip. Once the user has selected the clip, the user can select "OK" 444. Once selecting "OK" the preview clip of "Water" will start to play. FIG. 4K depicts a screen where a user can enter information to personalize the clip in the fields "Your Message Here" 446 in a "Make It Mine" screen 448. As shown, each field has space for up to 14 characters, but the length of the field can be adjusted to any supported size. This character sizing is determined during the campaign design/creative stage. The "Make It Mine" screen 448 can have two options "Close" 450, to close out of the make it "Make It Mine" screen 448 and "Create" 452 to create the clip. FIG. 4L depicts a user using a virtual key board to enter in the text "Electric Playground Rocks!" FIG. 4M depicts the screen with the text inserted. At this point, the user can select "Create" 452 to create the clip. FIG. 4N depicts a status screen, displayed to the user while the system generates the personalized clip. The status screen includes status bar 406, e.g., showing a status of 21% complete. FIG. 4O depicts another status screen, displayed to the user while the system generates the personalized clip, showing the status bar 406 with a status of 39% complete. While the user is waiting for the clip to be prepared, the device displays different informational images along with the status bar updates. FIG. 4P is a screen that asks the user, after the clip has been created, if the user would like to view the clip now or later. The status bar is at 100% complete. FIG. 4Q depicts the my clips screen, which shows a user all the clips that the user has created. The user can select a clip and then play the clip. Above the selected clip "Water: Electric Playground Rocks!" a credit indicator 454 indicates the number of remaining clips, for example, 94 credits. Also, at this point, a user can share the clip through social media channels or email.

Figure 4R:
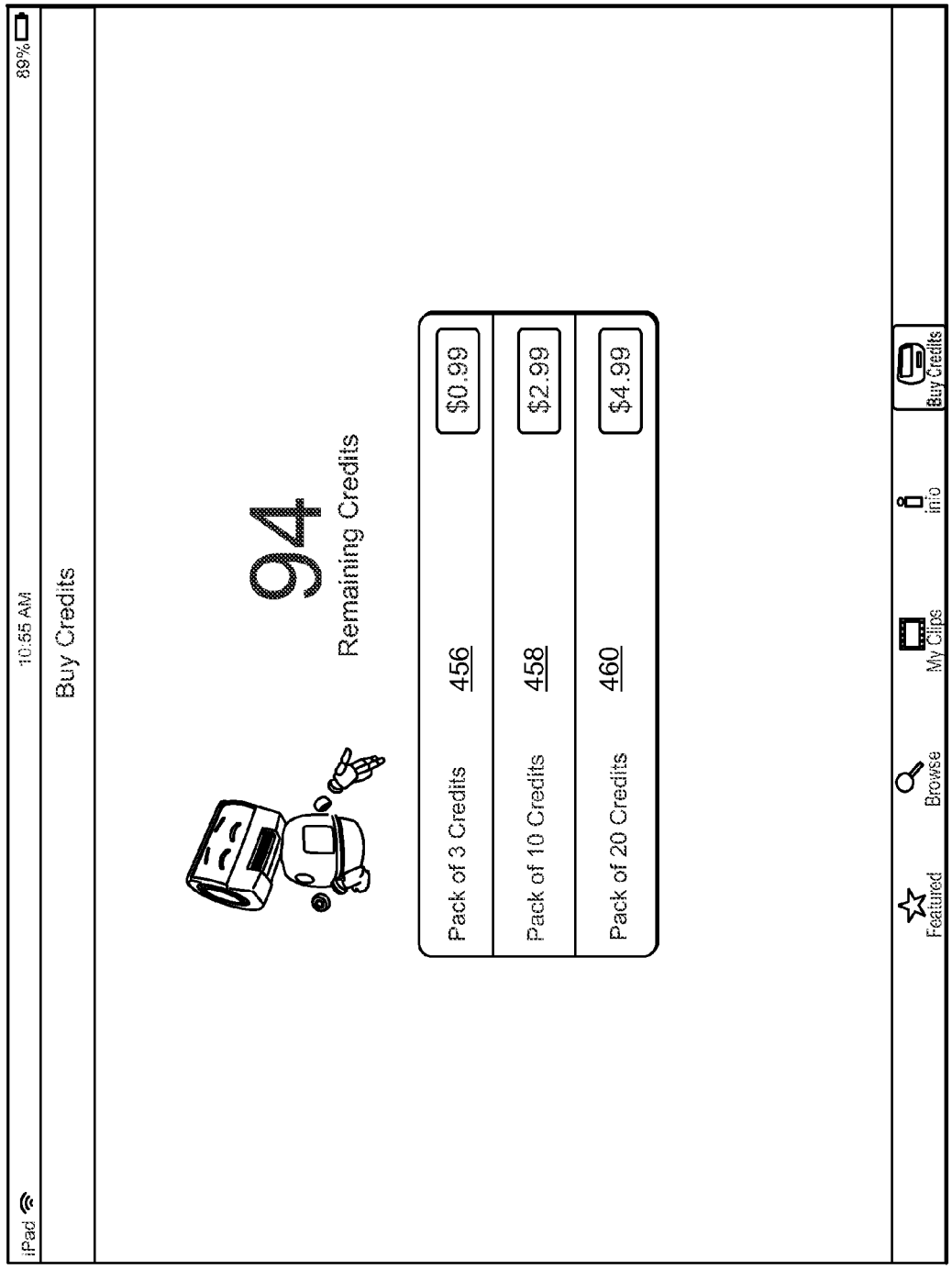
Figure 4S:
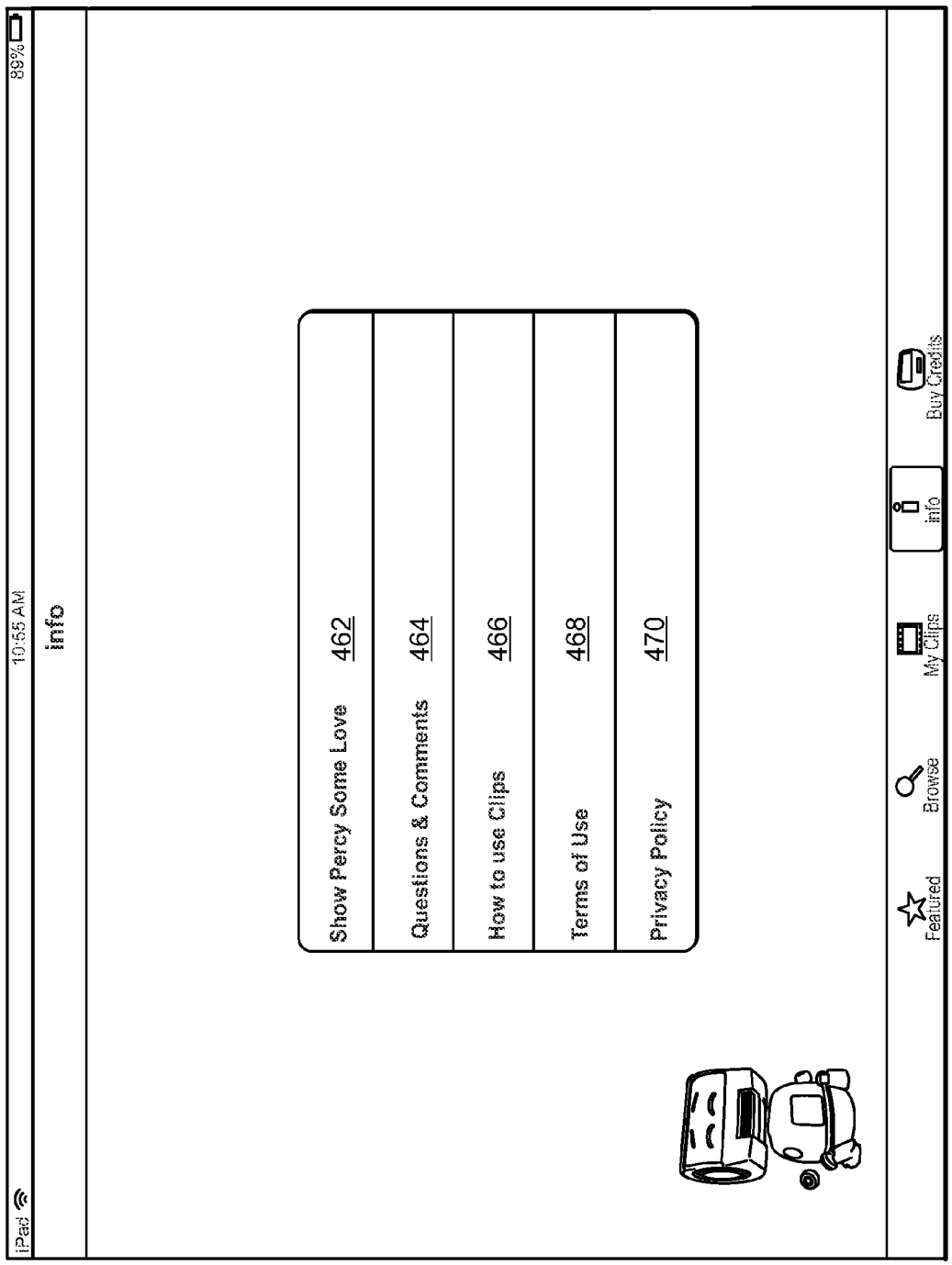
Figure 4T:
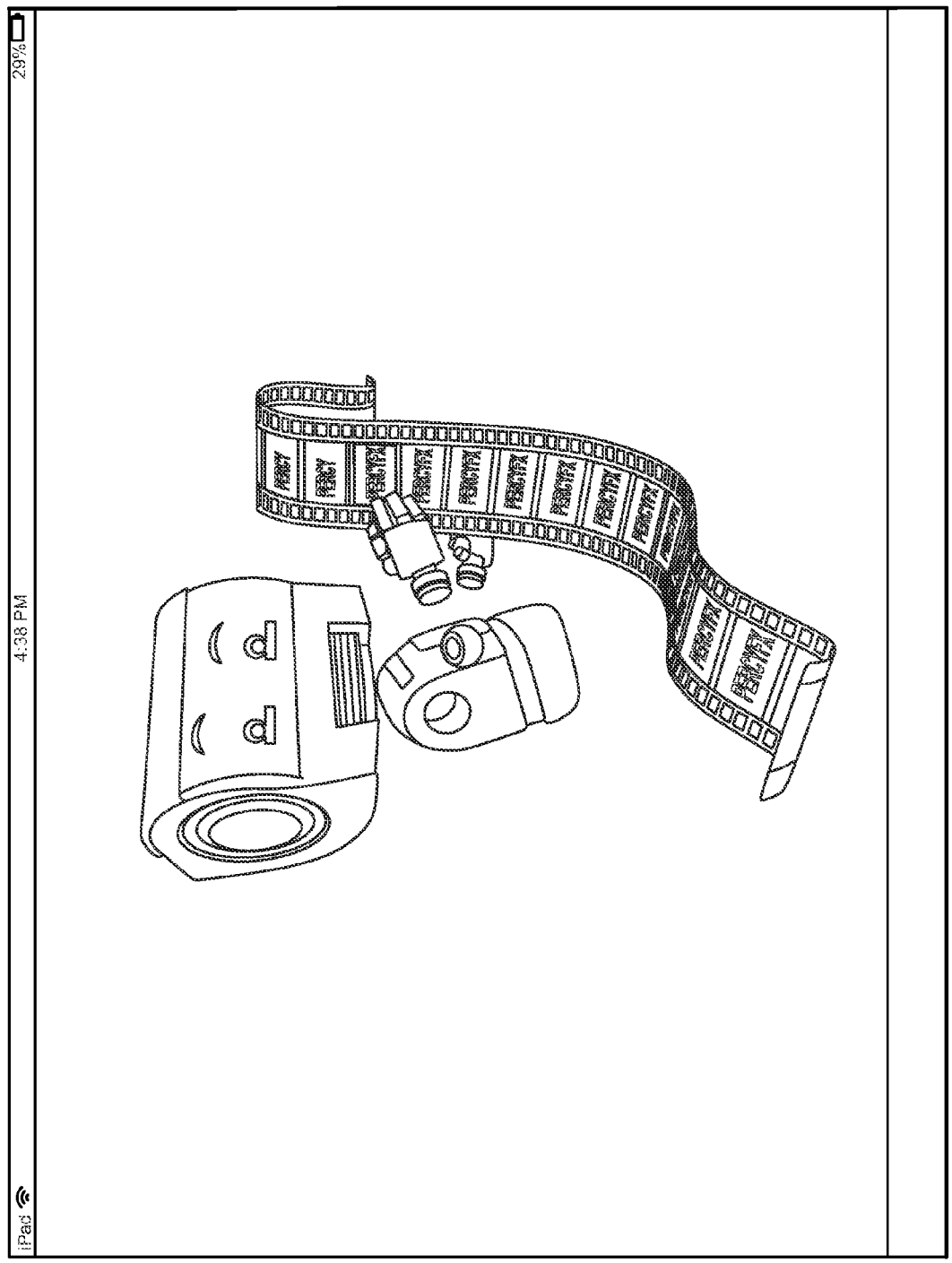

FIG. 4R depicts the Buy Credits screen. The screen indicates how many credits a user has remaining, in this case 94, and provides the option for the user to purchase credits, for example, in a pack of 3 credits 456, a pack of 10 credits 458, and a pack of 20 credits 460. FIGS. 4S and 4U depict alternatives for the info screen and can include options "Show Percy Some Love" 462, "Questions & Comments" 464, "How to Use Clips" 466, "Terms of Use" 468, "Privacy Policy" 470, "Share This App" 472. "Show Percy Some Love" 462 is an area where the user can add a review. "Questions & Comments" 464 opens a pre-populated email form for the purpose of communicating with the support team. The user can, for example, add comments relating to any issue they are having. The pre-populated items include device UDID, device name, iOS software version, App software version, time stamp, language code and current network connection. "How to Use Clips" 466 are video images that provide suggestions on uses for the app. These video images continue to repeat until the user moves from this screen. "Terms of Use" 468 is the area where the user can review the 'term of use' for the app. "Privacy Policy" 470 is the area where the user can review the 'privacy policy' for the system. "Share This App" 472 opens a pre-populated email for the user to forward an email to a friend that may want to download the app. The email has the link to the app location.

Those of skill in the art will appreciate that the various illustrations in the specification and drawings described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

While there have been shown and described examples of the present invention, it will be readily apparent to those skilled in the art that various changes and modifications may be made therein without departing from the scope of the invention.

What is claimed:

1. A method executed by a computer system operatively connected to a data network for generating data representing a video clip that is a customization of a pre-existing video clip, the method comprising:
   retrieving from a database at least one pre-existing template video clip stored in a database, each of said template video clips being comprised of a set of frames, a predetermined sub-set of which are designated static frames and a predetermined sub-set of which are designated dynamic frames where the database is further comprised of a set of data elements corresponding to each video clip that specify for each video clip which of the set of frames are the static frames that are not modifiable and which frames are the dynamic frames that may be modified;
   transmitting from a web server to a computer operated by a user the at least one retrieved template video clip;
   receiving at the web server from the user's computer data representing a selection of one of the at least one template video clips;
   receiving at the web server customizing data from the user's computer, wherein said customizing data represents visual features usable to personalize the selected template video clip for the user;
   generating the customized video clip by determining a marked region within the dynamic frames to be used for incorporating the customizing data by reading data from a data file associated with the selected template video clip that defines the boundaries of the marked region;
   incorporating the customizing data into the video data within the marked region comprising the dynamic frames by deriving pixel data from the customizing data in dependence on a data file stored in memory representing a pre-determined geometric mapping from the customizing data to the marked region corresponding to the selected template video clip;
   replacing at least part of the pixel data in the dynamic frame that is within the marked region with the derived pixel data;
   and concatenating the modified dynamic frames with the static frames of the user's corresponding selected template video clip;
   storing in data memory the data representing the customized video clip.

2. The method of claim 1 where the deriving pixel data step is further comprised of:
   using the geometric mapping to convert the customizing data that represents an apparently two dimensional item into data representing an apparent three dimensional object that appears upon rendering and display to reside within the marked region; and
   storing the converted data.

3. The method of claim 1 where the incorporating step is comprised of:
   deriving a plurality of pixel data values from the customizing data; and
   calculating replacement pixel data values for the marked region of the dynamic frame by combining the plurality of pixel data values derived from the customizing data with a plurality of pixel data values in the marked region of the dynamic frame; and
   replacing the plurality of the pixel data values within the marked region with the calculated pixel data values.

4. The method of claim 1 wherein the customizing data is comprised of video data.

5. The method of claim 1 wherein the customizing data is comprised of an image.

6. The method of claim 1 wherein the customizing data is comprised of text.

7. The method of claim 1 wherein the generating step for the plurality of selected plurality of video clips is executed concurrently.

8. A computer system comprised of at least one central processing unit operatively connected to at least one data storage device configured to generate data representing a video clip that is a customization of a pre-existing video clip, the system comprising:
   a data storage module comprised of data representing at least one template video clip, each of said template video clips being comprised of a set of frames, a predetermined sub-set of which are designated static frames and a predetermined sub-set of which are designated dynamic frames where the data storage module is further comprised of a set of data elements corresponding to each video clip that specify for each video clip which of the set of frames are the static frames that are not modifiable and which frames are the dynamic frames that may be modified;

a communication module configured to transmit from a web server to a computer operated by a user the at least one retrieved template video clip;

a data storage module comprised of data received from the user's computer representing a selection of one of the at least one template video clips;

a data storage module comprised of customizing data received from the user's computer, wherein said customizing data represents visual features usable to personalize the selected template video clip for the user;

a generating module configured to generate the customized video clip, by determining a marked region within the dynamic frames to be used for incorporating the customizing data by reading data from a data file associated with the selected template video clip that defines the boundaries of the marked region;

incorporating the customizing data into the video data within the marked region comprising the dynamic frames by deriving pixel data from the customizing data in dependence on a data file stored in memory representing a pre-determined geometric mapping from the customizing data to the marked region corresponding to the selected template video clip;

replacing at least part of the pixel data in the dynamic frame that is within the marked region with the derived pixel data;

and concatenating the modified dynamic frames with static frames of the user's corresponding selected template video clip;

and a data storage module configured to store the data representing the customized video clip.

9. The system of claim 8 where the generating module is further configured to:
use the geometric mapping to convert customizing data that represents an apparently two dimensional item into data representing an apparent three dimensional object that when rendered and displayed appears to reside within the marked region and to store the converted data.

10. The system of claim 8 where the generating module is further configured to:
derive a plurality of pixel data values from the customizing data; and
calculate replacement pixel data values for the marked region of the dynamic frame by combining the plurality of pixel data values derived from the customizing data with a plurality of pixel data values in the marked region of the dynamic frame; and
replace the plurality of the pixel data values within the marked region with the calculated pixel data values.

11. The system of claim 8 wherein the customizing data is comprised of video data.

12. The system of claim 8 wherein the customizing data is comprised of an image.

13. The system of claim 8 wherein the customizing data is comprised of text.

14. The system of claim 8 wherein the generating module is configured to generate the custom video clips concurrently.

15. A non-transient computer data storage device containing data, that when executed by a computer system, executes a method for generating data representing a video clip that is a customization of a pre-existing video clip, the method comprising:

retrieving from a database at least one pre-existing template video clip stored in a database, each of said template video clips being comprised of a set of frames, a predetermined sub-set of which are designated static frames and a predetermined sub-set of which are designated dynamic frames where the database is further comprised of a set of data elements corresponding to each video clip that specify for each video clip which of the set of frames are the static frames that are not modifiable and which frames are the dynamic frames that may be modified;

transmitting from a web server to a computer operated by a user the at least one retrieved template video clip;

receiving at the web server from the user's computer data representing a selection of one of the at least one template video clips;

receiving at the web server customizing data from the user's computer, wherein said customizing data represents visual features usable to personalize the selected template video clip for the user;

generating the customized video clip, by determining a marked region within the dynamic frames to be used for incorporating the customizing data by reading data from a data file associated with the selected template video clip that defines the boundaries of the marked region;

incorporating the customizing data into the video data within the marked region comprising the dynamic frames by deriving pixel data from the customizing data in dependence on a data file stored in memory representing a pre-determined geometric mapping from the customizing data to the marked region corresponding to the selected template;

replacing at least part of the pixel data in the dynamic frame that is within the marked region with the derived pixel data;

and concatenating the modified dynamic frames with the static frames of the user's corresponding selected template video clip; and storing in data memory the data representing the customized video clip.

* * * * *